(12) United States Patent
Shiohara

(10) Patent No.: US 10,044,912 B2
(45) Date of Patent: Aug. 7, 2018

(54) IMAGING DEVICE AND IMAGE PROCESSING DEVICE FOR OUTPUTTING IMAGE SIGNAL TO BE DISPLAYED, AND DISPLAY CONTROL DEVICE AND IMAGING DISPLAY APPARATUS FOR DISPLAYING IMAGE SIGNAL

(71) Applicant: SEIKO EPSON CORPORATION, Tokyo (JP)

(72) Inventor: Ryuichi Shiohara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/107,200

(22) PCT Filed: Dec. 25, 2014

(86) PCT No.: PCT/JP2014/006467
§ 371 (c)(1),
(2) Date: Jun. 22, 2016

(87) PCT Pub. No.: WO2015/145515
PCT Pub. Date: Oct. 1, 2015

(65) Prior Publication Data
US 2017/0034401 A1    Feb. 2, 2017

(30) Foreign Application Priority Data
Mar. 25, 2014  (JP) ................................ 2014-062602

(51) Int. Cl.
*H04N 5/04*    (2006.01)
*H04N 5/232*   (2006.01)
*G09G 3/20*    (2006.01)

(52) U.S. Cl.
CPC ............. *H04N 5/04* (2013.01); *G09G 3/2096* (2013.01); *H04N 5/23293* (2013.01)

(58) Field of Classification Search
CPC .......... H04N 5/04; H04N 5/06; H04N 5/0675; H04N 5/23293; H04N 19/136;
(Continued)

(56) References Cited

U.S. PATENT DOCUMENTS 8,159,564 B2 *  4/2012  Matsumoto .......... H04N 5/3454
                                              348/240.2
2006/0050305 A1 *  3/2006  Tokuyama ........... H04N 5/2628
                                              358/1.15
(Continued)

FOREIGN PATENT DOCUMENTS

JP    2002-244611 A    8/2002
JP    2005-039711 A    2/2005
(Continued)

Primary Examiner — Twyler Haskins
Assistant Examiner — Akshay Trehan

(57) ABSTRACT

A short delay time from imaging of an imaging element to displaying on a view finder is realized using a simple circuit configuration. In a live view mode, an image processing circuit performs image processing on imaging data from an image sensor, and generates image data of a display image. When processing for one line ends, progress information is output. When the image data of the display image is able to be output in synchronization with a second horizontal synchronization signal, a timing generator causes a data enable signal to be active, and supplies the image data to a data input unit according to this progress information on the other hand, when the image data is unable to be output, the timing generator causes the data enable signal to be inactive and supplies dummy data to the data input unit.

10 Claims, 16 Drawing Sheets

(58) Field of Classification Search
CPC .... H04N 19/146; H04N 19/15; H04N 19/152; H04N 21/4307; H04N 21/4621; H04N 5/4401; G09G 3/2096
See application file for complete search history.

(56) References Cited

U.S. PATENT DOCUMENTS

| | | | |
|---|---|---|---|
| 2007/0211153 A1* | 9/2007 | Uchida | H04N 5/23293 348/231.99 |
| 2008/0165268 A1* | 7/2008 | Takahashi | H04N 5/232 348/333.01 |
| 2010/0328514 A1* | 12/2010 | Hosoe | G06F 17/30274 348/333.05 |
| 2011/0025869 A1* | 2/2011 | Lee | H04N 19/42 348/222.1 |
| 2011/0285734 A1 | 11/2011 | Shiohara | |
| 2011/0285894 A1 | 11/2011 | Shiohara et al. | |
| 2011/0292236 A1 | 12/2011 | Shiohara | |
| 2011/0310268 A1 | 12/2011 | Shiohara | |
| 2011/0310269 A1 | 12/2011 | Shiohara | |
| 2012/0092506 A1* | 4/2012 | Ino | H04N 5/232 348/207.1 |
| 2014/0095744 A1* | 4/2014 | Yoshida | G06F 5/14 710/53 |
| 2014/0240542 A1* | 8/2014 | Toguchi | H04N 5/23293 348/231.99 |

FOREIGN PATENT DOCUMENTS

| | | |
|---|---|---|
| JP | 2007-243615 A | 9/2007 |
| JP | 2007-295096 A | 11/2007 |
| JP | 2008-203792 A | 9/2008 |
| JP | 2010-268388 A | 11/2010 |
| JP | 2011-244170 A | 12/2011 |
| JP | 2011-249963 A | 12/2011 |
| JP | 2011-252993 A | 12/2011 |
| JP | 2012-004770 A | 1/2012 |
| JP | 2012-004771 A | 1/2012 |

* cited by examiner

| SETTING ITEM | SET VALUE | [UNIT] |
|---|---|---|
| HORIZONTAL SYNCHRONIZATION PERIOD | 1H | DOT CLOCK |
| HORIZONTAL BACK PORCH | HBP | DOT CLOCK |
| NUMBER OF HORIZONTAL PIXELS | HDISP | DOT CLOCK |
| HORIZONTAL FRONT PORCH | HFP | DOT CLOCK |
| VERTICAL SYNCHRONIZATION PERIOD | 1V | HORIZONTAL SYNCHRONIZATION NUMBER |
| VERTICAL BACK PORCH | VBP | HORIZONTAL SYNCHRONIZATION NUMBER |
| NUMBER OF VERTICAL PIXELS | VDISP | HORIZONTAL SYNCHRONIZATION NUMBER |
| VERTICAL FRONT PORCH | VFP | HORIZONTAL SYNCHRONIZATION NUMBER |

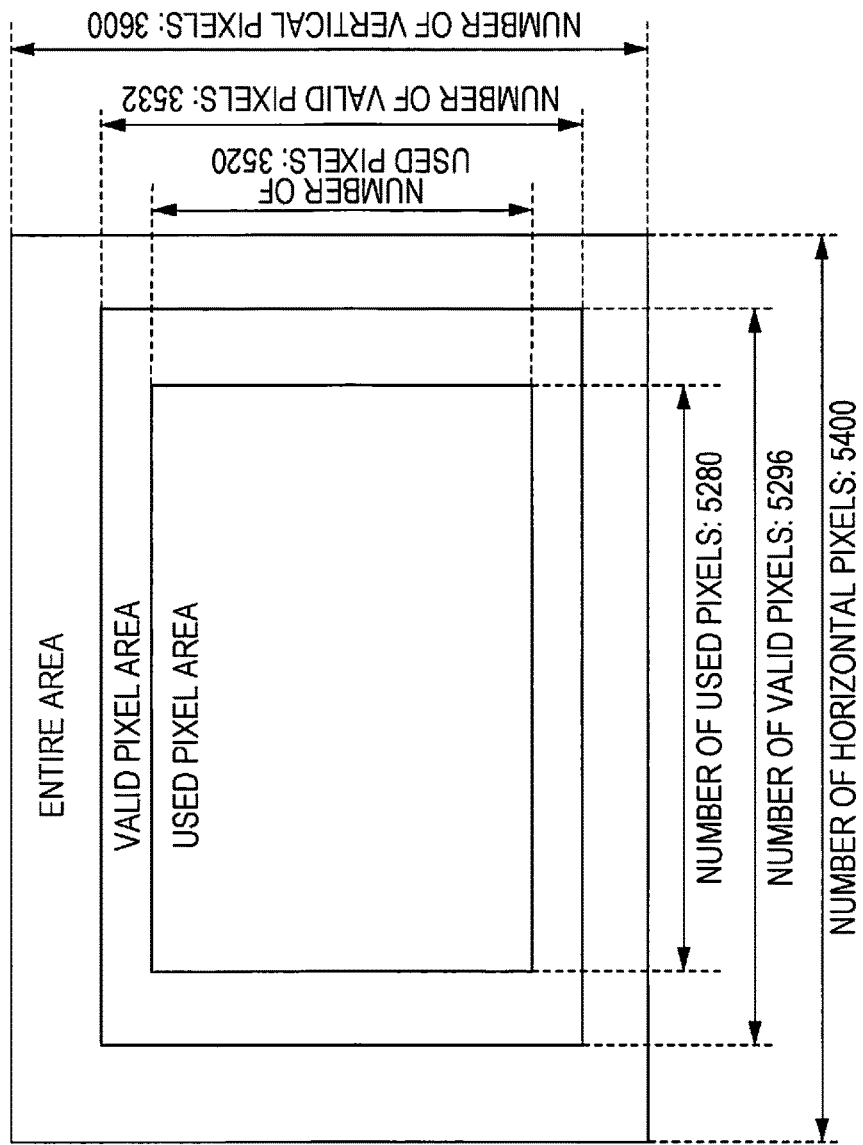

FIG. 8

| G | R | G | R | G | R | ... |
|---|---|---|---|---|---|---|
| B | G | B | G | B | G | ... |
| G | R | G | R | G | R | ... |
| B | G | B | G | B | G | ... |
| G | R | G | R | G | R | ... |
| B | G | B | G | B | G | ... |

IMAGING DEVICE AND IMAGE PROCESSING DEVICE FOR OUTPUTTING IMAGE SIGNAL TO BE DISPLAYED, AND DISPLAY CONTROL DEVICE AND IMAGING DISPLAY APPARATUS FOR DISPLAYING IMAGE SIGNAL

TECHNICAL FIELD

The present invention relates to an imaging device, an image processing device, a display control device and an imaging display apparatus that cause a captured image to be displayed.

BACKGROUND ART

In a so-called mirror-less SLR digital camera, an image of a subject can be confirmed through a so-called live view operation in which an image according to an image signal obtained by imaging in an image sensor such as a charge coupled device (CCD) or a complementary metal-oxide semiconductor (CMOS) image sensor is displayed in real time on a liquid crystal panel provided on a back surface of a housing or an electronic view finder (hereinafter, an EVF) attached to an upper portion of the housing.

However, in this live view, a long delay occurs from imaging of a subject in the image sensor to displaying on the view finder. Therefore, it becomes difficult to cause a camera to follow a moving subject. Further, when imaging of a still image is instructed based on the displayed image of a subject, a difference in a timing is generated between the displayed image of the subject and the image of a still image that is actually captured. In particular, it becomes difficult to capture an intended still image in the case of a fast moving subject.

Therefore, a technology for shortening a delay from capture in an image sensor of an image signal displayed on the view finder or the like has been known (for example, PTL 1).

CITATION LIST

Patent Literature

[PTL 1]
JP-A-2011-244170

SUMMARY OF INVENTION

Technical Problem

In the technology described in PTL 1, a horizontal scanning period of the image signal is adjusted through, for example, extension of a front porch time of the horizontal scanning period of the image signal, and a delay after imaging in the image sensor to displaying on the EVF is shortened when viewed in units of frames. In such an operation, since a timing of the horizontal synchronization signal varies, a configuration for following the variation in the timing of the horizontal synchronization signal to perform display control is necessary in a driving circuit of the EVF or the like. Therefore, a circuit configuration becomes complicated.

The present invention has been made in view of the above-described circumstances and it is an object of the present invention to realize a short delay time from imaging of an imaging element to displaying using a simple circuit configuration.

Solution to Problem

According to an aspect of the present invention, there is provided an imaging device including: an imaging element that captures an image and outputs an imaging signal; an image signal output unit that outputs an image signal based on the imaging signal; and a control signal output unit that outputs a control signal indicating whether the output image signal is valid or invalid in synchronization with a horizontal synchronization signal.

According to this aspect, since the control signal output unit outputs the control signal indicating whether the output image signal is valid or invalid in synchronization with the horizontal synchronization signal, it is possible to determine whether the image signal output from the image signal output unit is valid or invalid.

In the imaging device according to the above-described aspect, it is preferable that a period of the horizontal synchronization signal is constant, and the image signal includes an invalid image signal and a valid image signal, and either the invalid image signal or the valid image signal is output in synchronization with the horizontal synchronization signal.

In the imaging device according to the above-described aspect, it is preferable that the control signal output unit outputs a control signal indicating that the image signal is the valid image signal when the image signal is able to be output in synchronization with the horizontal synchronization signal, and outputs a control signal indicating that the image signal is the invalid image signal when the image signal is unable to be output in synchronization with the horizontal synchronization signal.

According to this aspect, when the image signal is the invalid image signal, the display device (display unit) that receives the invalid image signal can regard the horizontal synchronization signal synchronized with the image signal as being a dummy and adjust a vertical scanning period. Further, since it is possible to determine whether the image signal is the valid image signal or the invalid image signal based on the control signal, it is possible to cause the valid image signal among image signals to be displayed on the display unit. Accordingly, when the image signal output unit outputs the invalid image signal as the image signal, it is possible to adjust a timing of displaying on the display unit provided in a subsequent stage. Further, the image processing of which the processing time varies may be image processing of which processing time necessary to obtain an image signal for one line varies. In this case, the image processing may be processing in units of lines or may be processing in units of blocks such as each of a plurality of lines, each half of one line, or each predetermined region. The point is that the image processing is any image processing as long as time required for obtaining the image signal for one line as a processing result varies.

In the imaging device according to this aspect, it is preferable that the image signal output unit includes an image processing circuit which performs image processing of which processing time is variable on the imaging signal, and outputs progress information indicating progress of the image processing; and an image output circuit that determines whether a signal obtained through the image processing of the image processing circuit is able to be output as the valid image signal in synchronization with the horizontal synchronization signal based on at least the progress information, and outputs the valid image signal when a determination condition is positive and the invalid image signal when the determination condition is negative. When the valid image signal is output as an image signal, it is necessary for at least image processing to be completed, but according to this aspect, since it can be detected that the image processing is completed based on the progress information, other conditions can be added as necessary to determine whether the signal is able to be output.

Next, according to another aspect of the present invention, there is provided an image processing device including: an image signal output unit that outputs an image signal based on an imaging signal obtained by capturing an image; and a control signal output unit that outputs a control signal indicating whether the output image signal is valid or invalid in synchronization with a horizontal synchronization signal.

According to this aspect, since the control signal output unit outputs the control signal indicating whether the output image signal is valid or invalid in synchronization with the horizontal synchronization signal, it is possible to determine whether the image signal output from the image signal output unit is valid or invalid.

Next, according to still another aspect of the present invention, there is provided a display control device including: an input unit that inputs an image signal and a control signal indicating whether the image signal is valid or invalid in synchronization with a horizontal synchronization signal; and a display control unit that performs control to cause a valid image signal to be displayed on a display unit based on the control signal. According to this aspect, the display control unit can determine whether the image signal input by the input unit is a valid image signal or an invalid image signal based on the control signal, and cause the valid image signal among the image signals to be displayed on the display unit. Accordingly, it is possible to cause only the valid image signal to be displayed on the display device even when the invalid image signal is included in the image signal.

In the display control device according to the above-described aspect, a frame rate at which the display unit can perform displaying may be higher than a frame rate of an imaging signal. Thus, even when the invalid image signal is supplied, a delay time up to displaying on the display unit can be sequentially shortened and synchronization can be made.

Next, according to still another aspect of the present invention, there is provided an imaging display apparatus including: the imaging device according to the present invention; the display control device according the present invention; and a display unit that displays an image.

BRIEF DESCRIPTION OF DRAWINGS

FIG. 6 is a diagram illustrating an example of a value set in a register.

FIG. 7 is a conceptual diagram illustrating a configuration example of a light receiving unit of an image sensor.

FIG. 8 is a conceptual diagram illustrating an example of an arrangement of pixels of the light receiving unit of the image sensor.

DESCRIPTION OF EMBODIMENTS

Hereinafter, preferred embodiments of an imaging device of the present invention will be described in detail. Further, these embodiments are illustrative, and accordingly, content of the present invention should not be restrictively construed. Further, a case in which, for example, a liquid crystal panel that is an example of an electro-optic device is used as a display element of a display unit will be described below in each embodiment.

[First Embodiment]
<Configuration of Imaging Display Apparatus>

Figure 1:
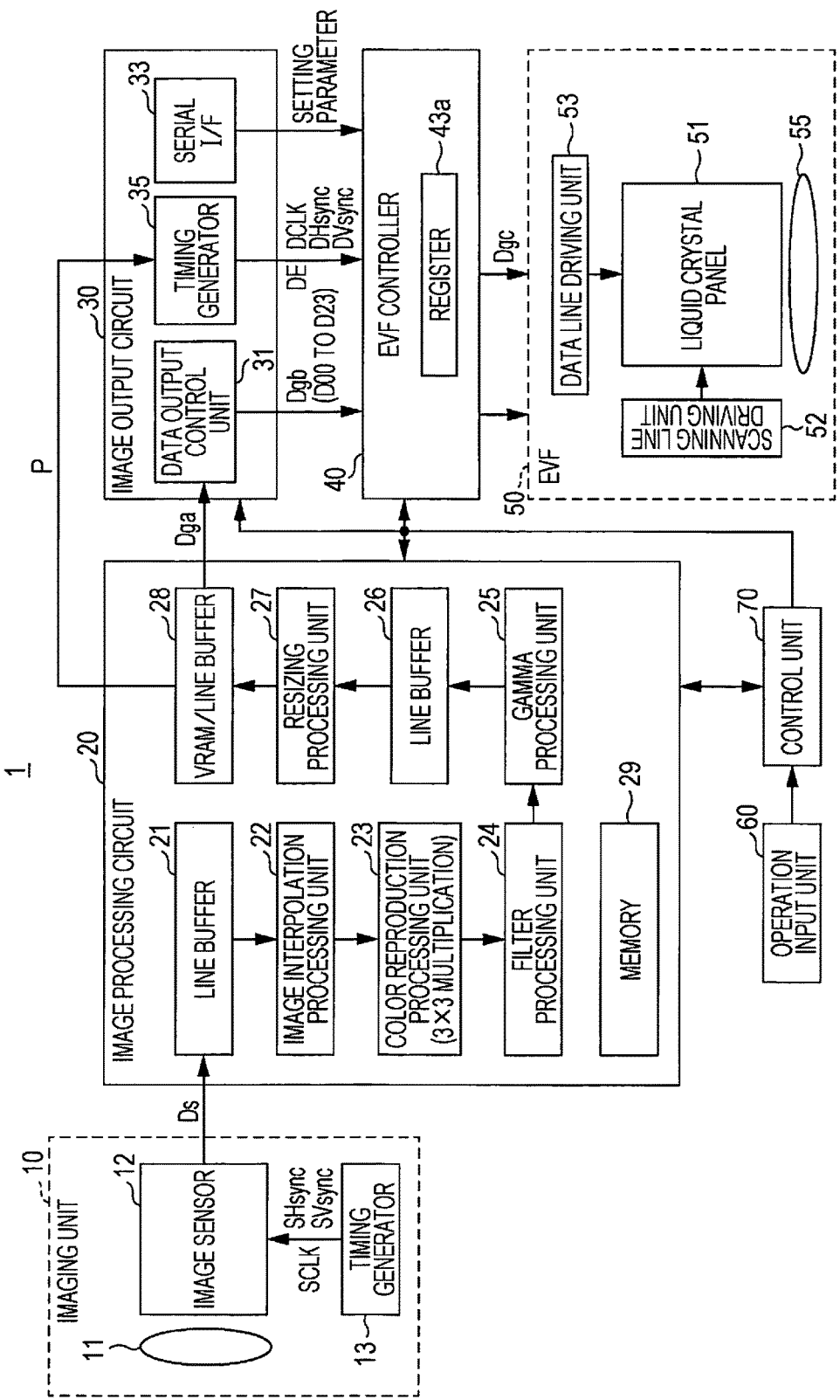
FIG. 1 is a block diagram illustrating a configuration example of an imaging display apparatus of an embodiment.

FIG. 1 is a block diagram illustrating a configuration of an imaging display apparatus 1 of this embodiment.

This imaging display apparatus 1 includes an imaging unit 10 that outputs imaging data Ds [imaging signal] obtained by imaging a subject in synchronization with a first horizontal synchronization signal SHsync, an image processing circuit 20 that performs image processing on the imaging data Ds to generate image data Dga, an image output circuit 30 that reads the image data Dga from the image processing circuit 20 in synchronization with a second horizontal synchronization signal DHsync and outputs image data Dgb (D00 to D23) [image signal], an EVF controller 40 that controls an operation of an EVF 50 according to the image data Dgb, the EVF 50 having a display element such as a liquid crystal panel, an operation input unit 60 that inputs, for example, an instruction to change a setting and perform photography, and a control unit 70 that controls an entire operation of the imaging display apparatus 1.

This imaging display apparatus 1 is a so-called mirror-less digital camera, in which a so-called live view operation in which an image obtained through imaging of the imaging unit 10 is displayed on the EVF 50 in real time, as well as a photography operation of reading the imaging data Ds of all pixels of an image sensor 12, performing a process such as a filtering process, and storing the data in a memory 29 for still image storage can be performed.

Then, the imaging unit 10 includes an imaging optical system 11 that forms an image of the subject, the image sensor 12 that line-sequentially scans signals from light receiving elements arranged in a matrix form and outputs the imaging data Ds according to the image of the subject, and a timing generator (TG) 13 that outputs various timing signals to the image sensor 12. The timing generator 13 generates a first vertical synchronization signal SVsync, a first horizontal synchronization signal SHsync, and a first dot clock SCLK, and outputs the signals to the image sensor 12. Further, the first vertical synchronization signal SVsync, the first horizontal synchronization signal SHsync, and the first dot clock SCLK may be output to the image processing circuit 20.

The image processing circuit 20 includes a line buffer 21 that temporarily stores the imaging data Ds, an image interpolation processing unit 22 that performs an interpolation process on the imaging data Ds stored in the line buffer 21, a color reproduction processing unit 23 that performs a color reproduction process on the interpolated imaging data Ds, a filter processing unit 24 that performs a filtering process on the imaging data Ds subjected to the color reproduction, a gamma processing unit 25 that performs gamma processing on the imaging data Ds subjected to the filtering process, a line buffer 26 that temporarily stores the imaging data Ds subjected to the gamma processing, a resizing processing unit 27 that performs a resizing process of adjusting a size on the imaging data Ds stored in the line buffer, and a VRAM/line buffer 28 that temporarily holds the imaging data Ds subjected to the resizing process as display image data Dga.

When processing of the image data Dga for one line is completed and the image data is able to be output, this VRAM/line buffer 28 outputs a writing completion signal when writing for one line of the display image ends, but this signal is used as progress information P for convenience. In this example, a pulse at a high level indicating "the image data is able to be output" is output as the progress information P. Since this pulse is output each time the processing of one line is completed, the number of pulses is counted from the start of a frame (a falling edge of a second vertical synchronization signal DVsync to be described below), and thus, a line of which the image data Dga is able to be output can be recognized.

If an image processing time of all lines is constant, processing of the image data Dg for one line is completed in a constant period, and thus, the progress information P is unnecessary. However, in the resizing process of performing adjustment of the size, the filtering process, or the like, a processing time required for generation of the image data Dga of the display image may be different between lines of the display image according to an algorithm (processing method). Therefore, in this embodiment, the progress information P is generated so that the image output circuit 30 of a subsequent stage can detect that the image processing circuit 20 becomes able to output the image data Dga for one line.

Figure 2:
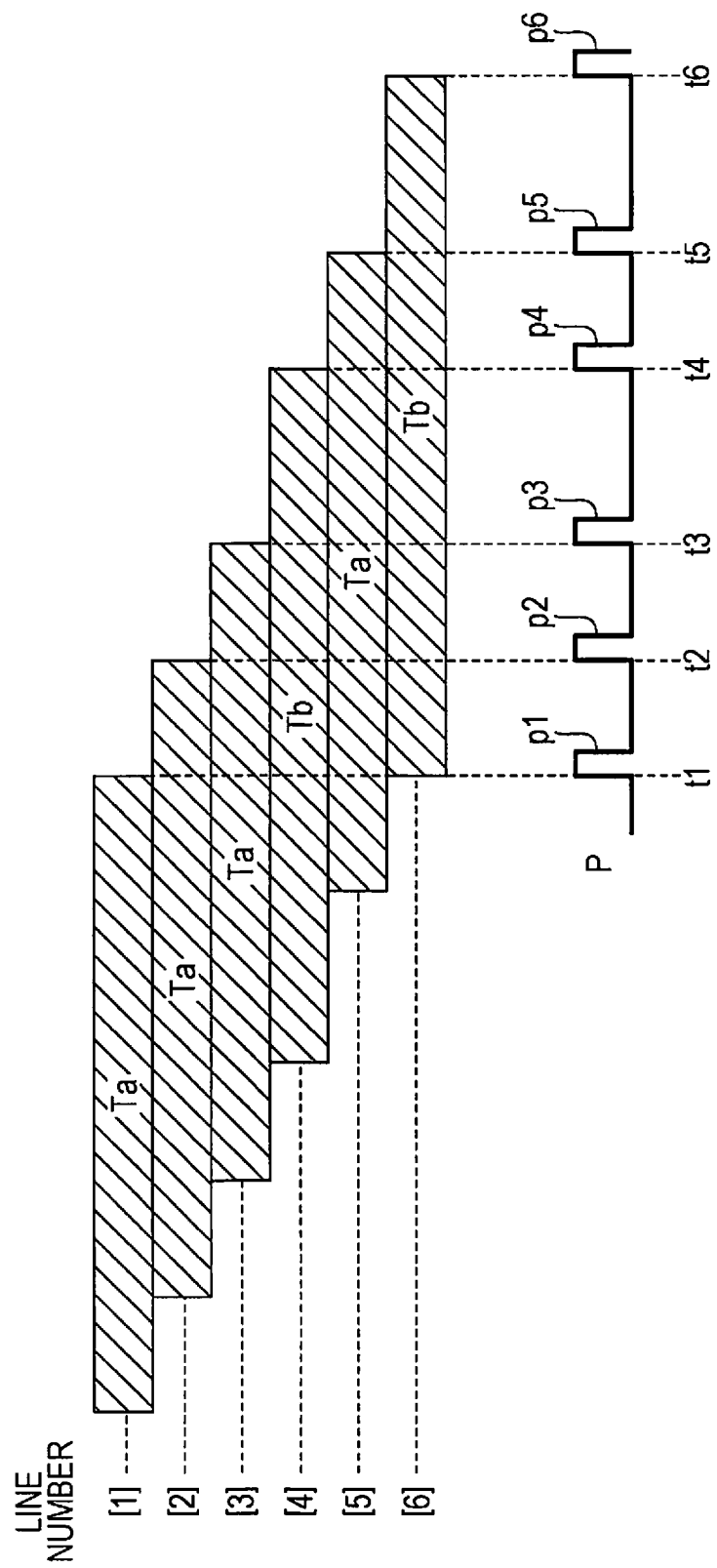
FIG. 2 is a conceptual diagram illustrating an example of a relationship between image processing and progress information.

FIG. 2 illustrates an example of a relationship between image processing of first to sixth lines and the progress information P. In FIG. 2, a shaded part indicates time required for image processing of one line. In this example, an image processing time required for generation of the image data Dga of the first to third and fifth lines is Ta, and an image processing time required for generation of the image data Dga of the fourth and sixth lines is Tb. Further, the image processing time Tb is longer than the image processing time Ta. When the time required for image processing differs from line to line in this way, a pulse interval of the progress information P varies according to the image processing time.

In this example, respective pulses p1 to p6 are generated at time points t1 to t6 at which the image processing of the first to sixth lines ends. Here, an interval between the pulse p1 and the pulse p2 and an interval between the pulse p2 and the pulse p3 are the same. However, the time Tb required for image processing of the fourth line is longer than the image processing time Ta. Therefore, the interval between the pulse p4 generated at the time point t4 and the pulse p3 is longer than an interval between the pulse p2 and the pulse p3.

The image output circuit 30 of a subsequent stage can detect that preparation for output of the image data Dga of a certain line is completed by referring to this progress information P. Also, when there is a reading request from the image output circuit 30, the VRAM/line buffer 28 outputs the image data Dga for one line to the data output circuit 30.

The image output circuit 30 illustrated in FIG. 1 includes a data output control unit 31 that controls output of image data Dgb (D00 to D23) to the EVF controller 40, a serial interface (I/F) 33 that transmits, for example, a setting parameter of a register 43a of the EVF controller 40, and a timing generator 35 that generates various timing signals. This timing generator 35 generates a second vertical synchronization signal DVsync, a second horizontal synchronization signal DHsync, a second dot clock DCLK, and a data enable signal DE [control signal]. Here, the second dot clock DCLK is not in synchronization with the first dot clock SCLK described above. Therefore, the timing generator 35 can be configured without using a PLL circuit or a frequency divider circuit necessary for synchronization.

The data enable signal DE is a signal that becomes active (in this example, at a high level) during a period in which valid image data Dgb (D00 to D23) is output and becomes inactive (in this example, at a low level) in other periods.

When the following conditions are satisfied, the timing generator 35 causes the data enable signal DE of an n-th line to be active.

First, it is necessary for reading of the imaging data Ds necessary to generate the n-th line from the image sensor 12 to be completed. When conversion of the number of lines in the resizing process is executed, for example, if the n-th line of the EVF 50 corresponds to an m-th line of the image sensor 12, it is necessary for the imaging data Ds of the m-th line to be read from the image sensor 12 to the image processing circuit 20 (first condition).

Second, it is necessary for generation of the image data Dga of the n-th line to be displayed on the EVF 50 to be completed (second condition).

Third, it is necessary for the preparation of a display timing to be completed in the n-th line. Specifically, it is necessary for a period to be a horizontal display active period (horizontal valid image period) HDISP in which the image data Dgb becomes valid (see FIG. 3) during 1 horizontal scanning period 1H (third condition).

It is necessary for the first condition to be satisfied in order to complete the generation of the image data Dga of the n-th line, which is the second condition. Also, it can be identified whether the second condition is satisfied based on the progress information P. However, even when the progress information P becomes active for the n-th line, this is a necessary condition, and the data enable signal DE does not become active with only this condition. That is, the timing generator 35 determines whether the n-th line to be displayed subsequently to the (n−1)-th line that is being currently output is able to be output while monitoring the progress information P, controls the data output control unit 31 to read the image data Dga of the n-th line from the VRAM/line buffer 28, issues the second horizontal synchronization signal DHsync, and causes the data enable signal DE to be active to output the image data Dgb of the n-th line to the EVF controller 40.

Figure 3:
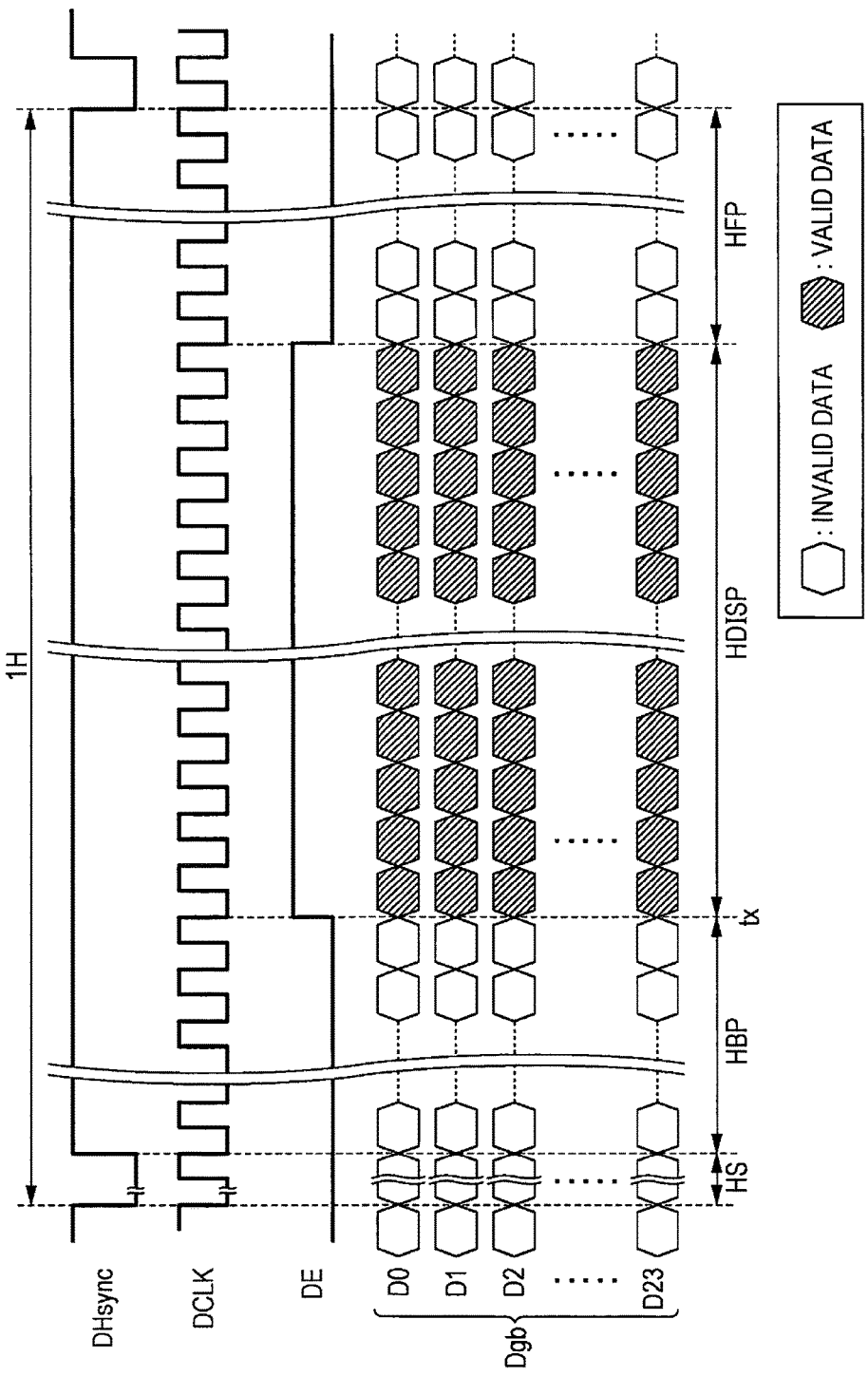
FIG. 3 is a timing chart illustrating an example of a signal supplied from an image output circuit to an EVF controller during one horizontal scanning period when valid image data Dgb is output.

FIG. 3 is a timing chart illustrating a relationship between the data enable signal DE and the image data Dgb during the 1 horizontal scanning period 1H in which the data enable signal DE becomes active. The 1 horizontal scanning period 1H includes a horizontal synchronization period HS in which the second horizontal scanning signal DHsync becomes active (at a low level), a horizontal back porch period HBP, a horizontal display active period HDISP, and a horizontal front porch period HFP, as illustrated in FIG. 3. The horizontal display active period HDISP is a period for outputting the valid image data Dgb, the data enable signal DE becomes active during the horizontal display active period HDISP, and the valid image data Dgb is output from the data output control unit 31 to the EVF controller 40. Meanwhile, the data enable signal DE becomes inactive (at a low level) during the horizontal synchronization period HS, the horizontal back porch period HBP, and the horizontal front porch period HFP other than the horizontal display active period HDISP, and invalid image data Dgb is output during these periods. The EVF controller 40 fetches the image data Dgb during a period in which the data enable signal DE becomes active and does not fetch the image data Dgb during a period in which the data enable signal DE becomes inactive.

Here, the number of second dot clocks DCLK during the horizontal synchronization period HS, the horizontal back porch period HBP, and the horizontal front porch period HFP is determined in advance. The completion of the preparation of the display timing, which is the third condition described above, means that the 1 horizontal scanning period 1H starts and a time point tx at which the horizontal back porch period HBP ends arrives.

Further, a rising timing and a falling timing of the data enable signal DE are synchronized with a falling edge of the second dot clock DCLK. Therefore, when the EVF controller 40 latches the image data Dgb at a rising timing of the second dot clock DCLK, a time margin can be held.

Figure 4:
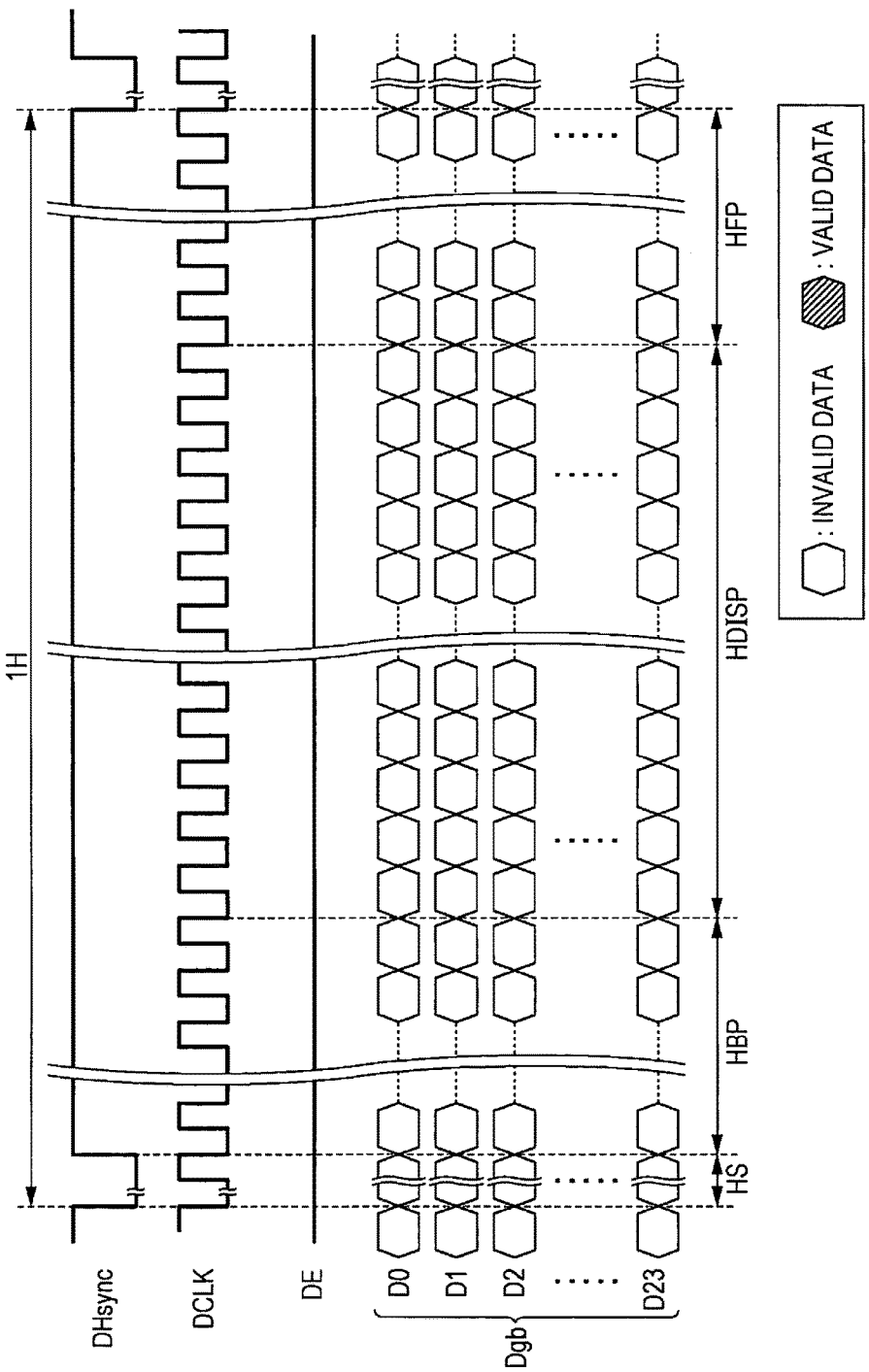
FIG. 4 is a timing chart illustrating an example of a signal supplied from the image output circuit to the EVF controller during one horizontal scanning period when valid image data is not output.

FIG. 4 is a timing chart illustrating a relationship between the data enable signal DE and the image data Dgb during the 1 horizontal scanning period 1H when the data enable signal DE becomes inactive. As illustrated in FIG. 4, since the data enable signal DE becomes always inactive, all pieces of image data Dgb become invalid. In this case, in the EVF controller 40, the image data Dgb of the corresponding line is not fetched.

In the above-described description, the units of the image processing circuit 20 and the image output circuit 30 except for the timing generator 35 function as an image signal output unit that outputs the image signal Dgb based on the imaging signal Ds, and the timing generator 35 functions as a control signal output unit that outputs the enable signal DE (control signal) indicating whether the output image signal Dgb is valid or invalid in synchronization with the horizontal synchronization signal DHsync.

Referring back to FIG. 1, the EVF controller 40 supplies various timing signals and image data Dgc to the EVF 50. The EVF 50 includes a liquid crystal panel 51 in which pixels are arranged in positions in which scanning lines and data lines intersect in a matrix form, a scanning line selection unit 52 that selects the scanning line of the liquid crystal panel 51, a data line driving unit 53 that drives the data lines, and an eyepiece optical system 55 that enlarges an image of the liquid crystal panel 51 so that the image is observable.

Figure 5:
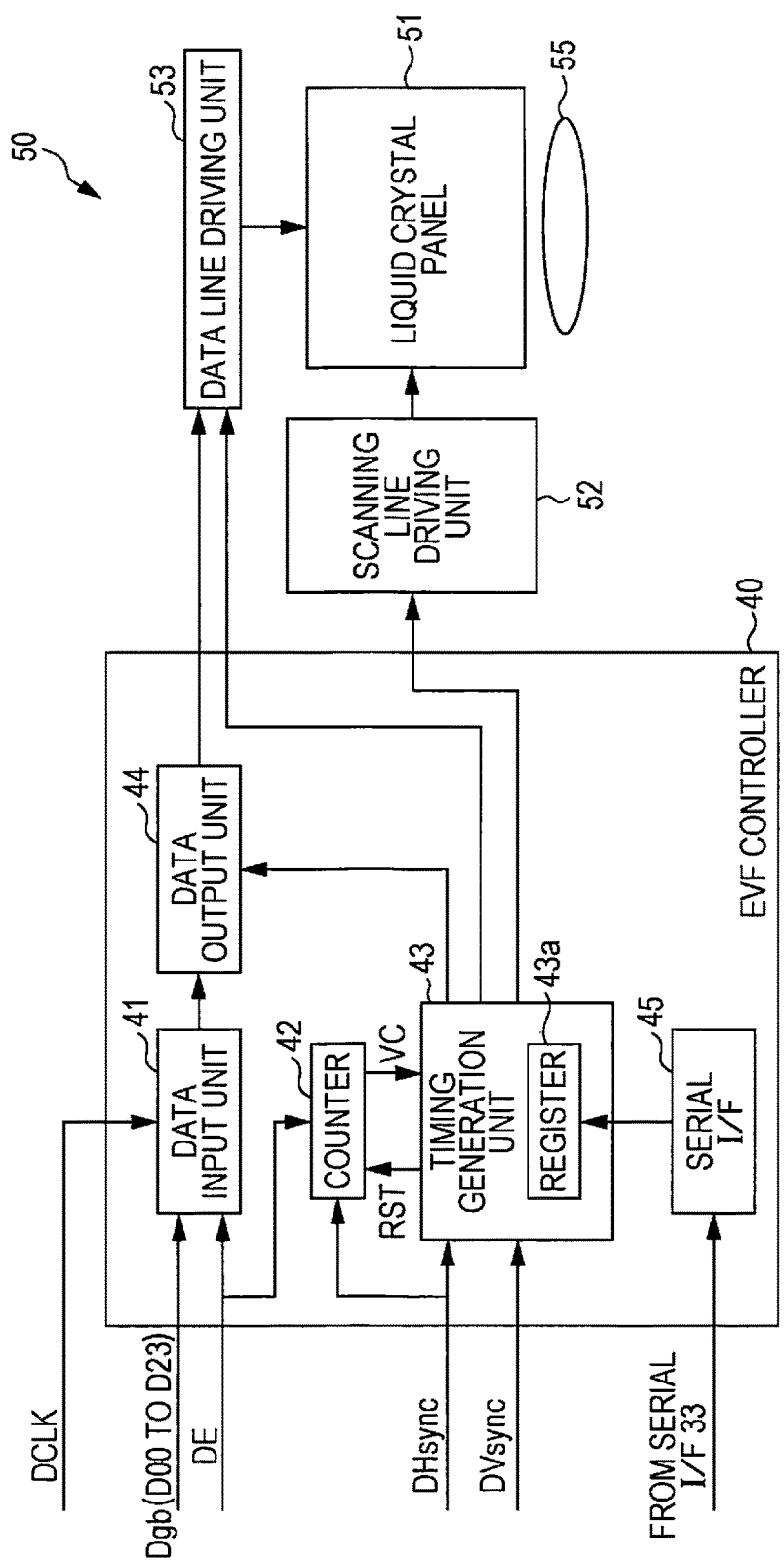
FIG. 5 is a block diagram illustrating a more detailed configuration example of the EVF controller constituting the imaging display apparatus.

FIG. 5 is a block diagram illustrating a detailed configuration of the EVF controller 40 and the EVF 50. The EVF controller 40 includes a data input unit 41 that inputs the image data Dgb from the data output control unit 31, a counter 42 that counts the number of lines of the valid image data according to the data enable signal DE and the second horizontal synchronization signal DHsync described above, a timing generation unit 43 that generates a driving timing of the EVF 50, a data output unit 44 that outputs the image data to the EVF 50, and a serial I/F 45 that performs, for example, reception of a command from the serial I/F 33, as illustrated in FIG. 5.

The timing generation unit 43 includes a register 43a, and a value of the register 43a is set according to, for example, a command from the image output circuit 30 received via the serial I/F 45. Specifically, the serial I/F 33 and the serial I/F 45 perform communication according to a protocol such as an Inter-Integrated Circuit (I2C) or a Serial Peripheral Interface (SPI). The serial I/F 33 transmits a command containing a setting parameter to the data output unit 44. The data output unit 44 sets the value of the register 43a according to the received setting parameter.

Figure 9:
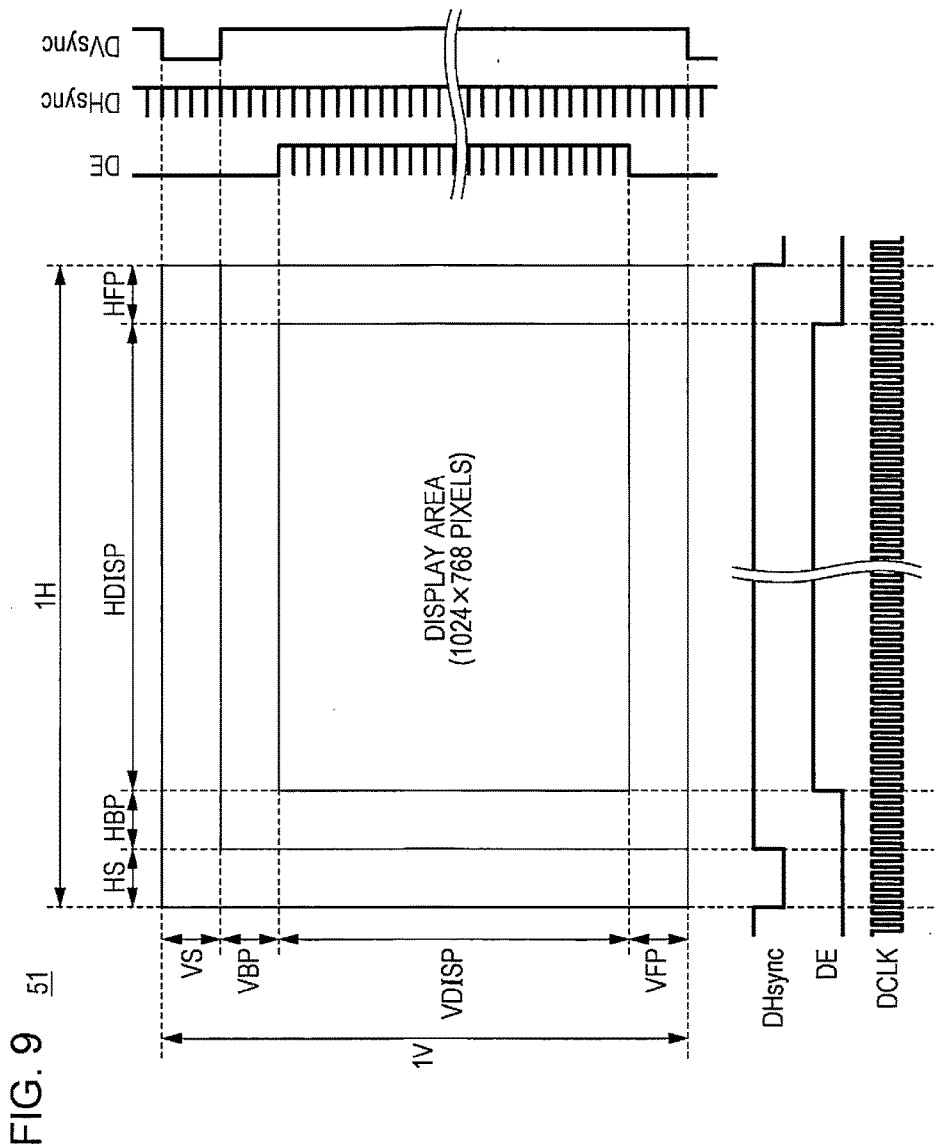
FIG. 9 is a conceptual diagram illustrating an example of a relationship between a display area of a liquid crystal panel and a driving timing in a vertical direction and a horizontal direction.

The setting parameters (setting items) set in the register 43a include, for example, a 1 horizontal synchronization period of the liquid crystal panel 51 (an interval 1H of the second horizontal synchronization signal DHsync in FIG. 9), a horizontal back porch period (HBP in FIG. 9), the number of horizontal pixels (the number of pixels in a horizontal direction of the display area corresponding to HDISP in FIG. 9), a horizontal front porch period (HFP in FIG. 9), a 1 vertical synchronization period (an interval 1V of the vertical synchronization signal DVsync in FIG. 9), a vertical back porch period (VBP in FIG. 9), the number of vertical pixels (the number of lines of the display area corresponding to VDISP in FIG. 9), and a vertical front porch period (VFP in FIG. 9), as illustrated in FIG. 6.

Thus, since the timing based on a specification of the EVF 50 can be set from the image output circuit 30, it is not necessary to change the EVF controller 40 even when the specification of the EVF 50 such as the liquid crystal panel 51 having a different size or a frame rate is changed. Thus, it is possible to improve versatility of the system.

Incidentally, more specifically, the above-described image sensor 12 can include a CMOS image sensor having about 18 million pixels of 5400*3600 pixels (a used pixel area: 5280*3520 pixels), for example, as illustrated in FIG. 7. This image sensor 12 becomes able to output the imaging data Ds, for example, at a frame rate of 120 Hz through, for example, decimation of the pixels of the line to be output in the live view mode in which a live view operation is performed. Specifically, the pixel of the image sensor 12 is configured in a manner in which light receiving units that receive R, G, and B light beams are arranged in a staggered shape (Bayer array), for example, as illustrated in FIG. 8. In the live view mode, the image sensor 12 sets, for example, the output lines to ⅓, and outputs an average for three pixels in a horizontal direction. Accordingly, the number of pixels in the image data Ds supplied from the image sensor 12 to the image processing circuit 20 becomes 1800*720 (the number of used pixels: 1760*704). Further, in the live view mode, a timing of the first vertical synchronization signal SVsync, the first horizontal synchronization signal SHsync, the first dot clock SCLK or the like generated by the timing generator 13 depends on this frame rate and the number of pixels.

Further, more specifically, the liquid crystal panel 51 can include a display element such as a liquid crystal (LCD) panel having a display area of 1024*768 pixels (a total number of lines N=768), for example, as illustrated in FIG. 9. Further, FIG. 5 conceptually illustrates a relationship between the display area of the liquid crystal panel 51 and signals such as the second vertical synchronization signal DVsync, the second horizontal synchronization signal DHsync, the data enable signal DE, and the dot clock DCLK used for control of the liquid crystal panel 51. This liquid crystal panel 51 becomes able to display one frame in a period shorter than a frame period of the image sensor 12. Specifically, this liquid crystal panel 51 can display, for example, an image according to the image data Dgc at a frame rate (1/frame period) of about 160 Hz, which is a maximum rate.

Thus, in the imaging display apparatus 1, since a period of one frame that can be displayed on the EVF 50 is shorter than a period of one frame of the imaging unit 10, the output of the imaging data Ds from the imaging unit 10 and image processing in the image processing circuit 20 are not performed in time even when the output of the image data Dga for displaying is performed at a timing of the EVF 50. Therefore, in this imaging display apparatus 1, in the live view mode, the output timing of the image data Dgb from the image output circuit 30 is adjusted according to the output of the image data Dga from the image processing circuit 20 so that the display of the EVF 50 follows the output timing of the imaging data Ds from the imaging unit 10, as will be described below.

Further, when an image according to the imaging data Ds (for example, for 1760*704 pixels) from the image sensor 12 is displayed on the liquid crystal panel 51 (for example, for 1024*682 pixels other than a display area [On Screen Display (OSD) area] of photography conditions or the like), it is necessary to perform, for example, adjustment of the size (resizing) using the above-described resizing processing unit 27 according to a difference in the number of pixels. The processing time required for generation of the image data of the display image may be different between the lines of the display image according to an algorithm for this resizing processing (processing method).

Further, when a lens distortion correction process or a filtering process is performed, the processing time necessary for generation of the display image data may be different between the lines according to a type of process. Therefore, time required for image processing in the image processing circuit 20 may be different between the lines of the display image. That is, a timing at which the generated image data Dga of the display image becomes able to be output may be different between the lines. Therefore, when the image data of the display image is output at a fixed timing at which a safety factor is expected at a maximum amount of variation of the timing at which the image data of the display image becomes able to be output, a delay time from imaging of the image sensor 12 to displaying on the liquid crystal panel 51 increases.

Therefore, in this imaging display apparatus 1, an output timing of the image data of the display image from the image output circuit 30 is adjusted in units of horizontal scanning periods (the period of the horizontal synchronization signal) of the EVF 50, such that a state in which a delay from imaging of the image sensor 12 to displaying on the liquid crystal panel 51 is minimized is kept in response to the timing at which the image data of the display image becomes able to be output from the image processing circuit 20.

<Operation>

Next, an operation of the above-described imaging display apparatus 1 will be described. The imaging display apparatus 1 operates at least in a photography mode and a live view mode. When a user operates the operation input unit 60 to instruct capture of a still image, a mode is shifted to the photography mode. In the photography mode, the image processing circuit 20 reads the imaging data Ds of all pixels of the image sensor 12, performs a process such as a filtering process, and stores the resultant data in the memory 29 for still image storage. On the other hand, when the user operates the operation input unit 60 to select the live view mode, the imaging display apparatus 1 executes the live view operation in which the imaging data Ds obtained through imaging of the image sensor 12 is displayed on the liquid crystal panel 51 in real time, as described above.

In the live view mode, the image processing circuit 20 performs a process, such as conversion of the number of pixels according to a difference with the number of pixels of the liquid crystal panel 51, to generate the image data Dga of the display image, and records the image data Dga in the VRAM/line buffer 28. The VRAM/line buffer 28 outputs a writing completion signal when writing of one line of the display image ends, but uses this signal as the progress information P for convenience. The timing generator 35 generates timing signals such as a second vertical synchronization signal DVsync, a second horizontal synchronization signal DHsync, and a data enable signal DE according to the progress information P. The data output control unit 31 reads, for every line, the image data Dga of the display image recorded in the VRAM/line buffer 28 to supply the image data Dga to the EVF controller 40 according to the timing signals generated by the timing generator 35. The EVF controller 40 drives the liquid crystal panel 51 according to the image data Dgb supplied from the data output control unit 31 and displays an image.

Figure 10:
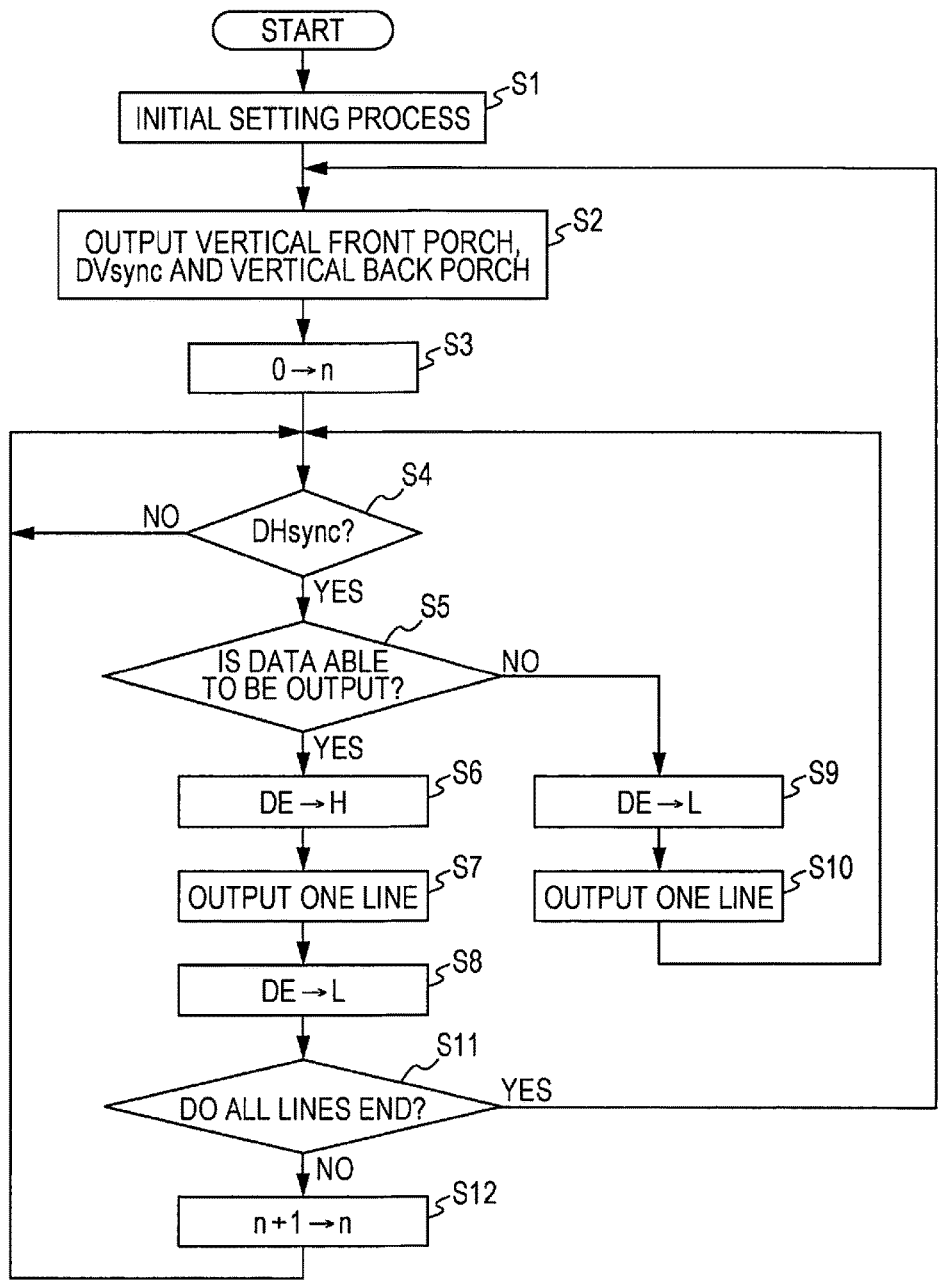
FIG. 10 is a flowchart illustrating an example of a process of outputting an image signal in an image output circuit.

FIG. 10 is a flowchart illustrating an operation of the image processing circuit 30 and the control unit 70 related to the live view mode. When the user operates the operation input unit 60 to select the live view mode, an initial setting process is executed (S1). In the initial setting process, the control unit 70 controls the image sensor 12 to output the imaging data Ds corresponding to the live view display. Accordingly, live view output is executed through a decimation reading operation most suitable for the live view mode from the image sensor 12. Further, in the initial setting process, the image processing circuit 30 transmits a setting parameter to the EVF controller 40. Accordingly, the setting parameter is set in the register 43a of the EVF controller 40. In the initial setting process, setting of the EVF controller 40 for a live view operation and a series of preparations for live view display of the EVF 50 are performed, and a series of preparations for displaying of a live view image fetched from the image sensor 12 is completed. Further, when the live view mode is selected in an initial state of the power supply, the initial setting process after power supply may be executed.

Then, the data output control unit 31 of the image output circuit 30 causes the image data Dgb to be invalid in the vertical front porch period VFP, the vertical synchronization period VS, and the vertical back porch period VBP. Specifically, the image data Dgb becomes "0", and dummy data is output from the data output control unit 31 (S2). Further, the timing generator 35 outputs the second horizontal synchronization signal DHsync during the vertical front porch period VFP, the vertical synchronization period VS, and the vertical back porch period VBP, and causes the second vertical synchronization signal DVsync to be active during the vertical synchronization period VS (S2).

Then, when the second vertical synchronization signal DVsync becomes active, the data output control unit 31 resets an internal counter (n) (S3), and waits until a timing at which a next second horizontal synchronization signal DHsync becomes active arrives (S4). When the timing at which the next second horizontal synchronization signal DHsync becomes active arrives, the timing generator 35 determines whether the valid image data Dgb can be output from the data output control unit 31 to the EVF controller 40 (S5). Specifically, a determination is made as to whether the first and second conditions described above are satisfied. That is, when the image data Dgb to be output next corresponds to the n-th line, a determination is made as to whether reading of the imaging data Ds necessary to generate the n-th line from the image sensor 12 is completed (first condition), and the image data Dga of the n-th line is recorded in the VRAM/line buffer 28 (second condition).

In step S5, when the n-th line of the image data Dgb of the display image can be output, the timing generator 35, for example, causes the data enable signal DE to be active (at a high level) during the horizontal display active period HDISP in which the valid image data Dgb is output, as illustrated in FIG. 3 (S6). Further, the data output control unit 31 reads the image data Dga of the display image for one line from the VRAM/line buffer 28 in synchronization with the dot clock DCLK, supplies the image data Dgb to the data input unit 41 of the EVF controller 40 (S7), and then causes the data enable signal DE to be inactive (at a low level) after the output of the valid image data Dgb for one line ends (S8).

Then, the timing generator 35 confirms whether the output of the image data Dgb of all lines (N lines) in one frame of the display image ends based on the value of the above-described counter (n) (S11), and returns to the above-described step S2 to start the process for the image data Dgb of the display image of the next frame when the output ends. When the process ends, the timing generator 35 increases the value of the counter (n) (S12) and waits for a timing of the next second horizontal synchronization signal DHsync (S4).

Figure 11:
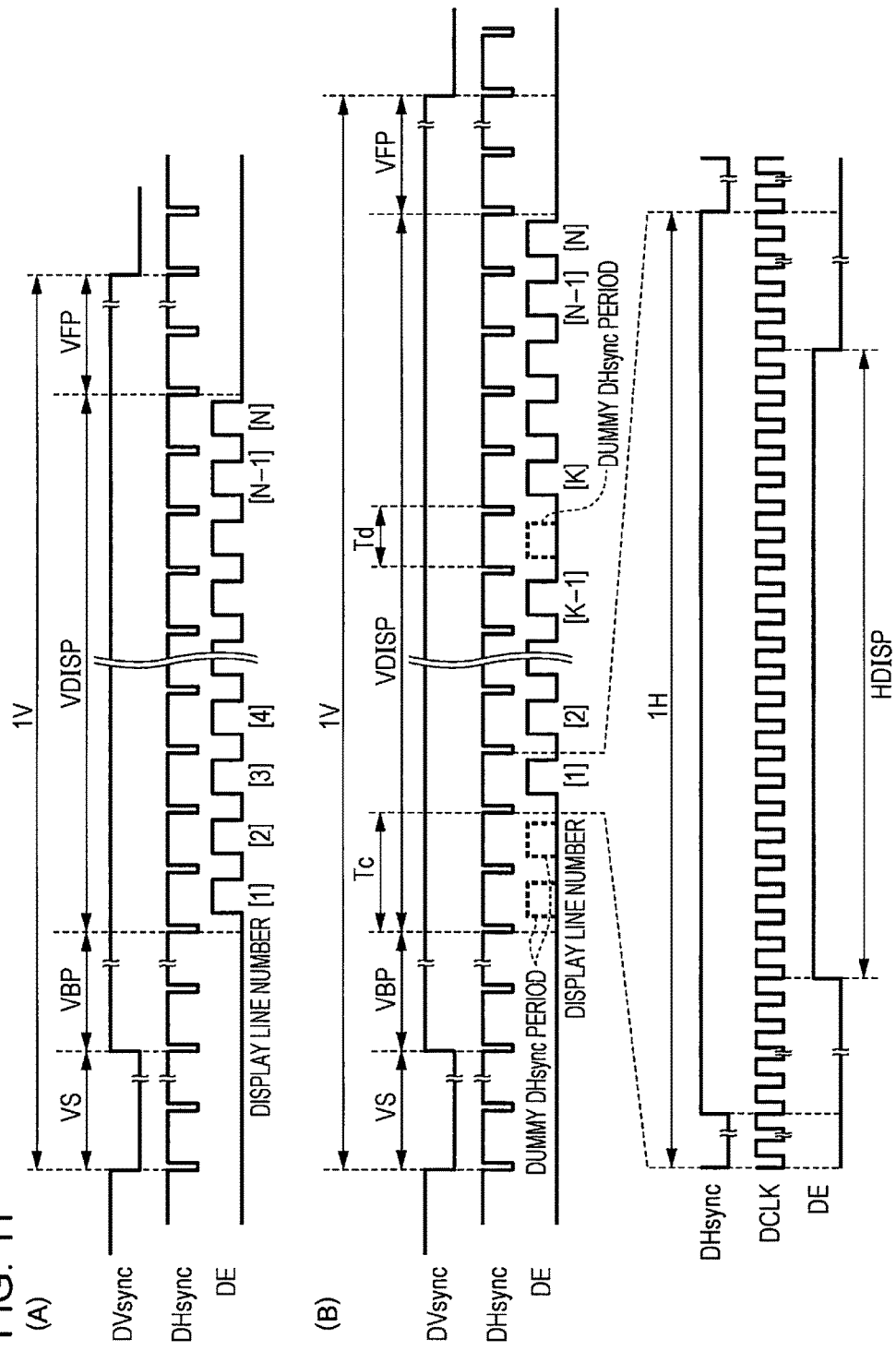
FIG. 11 is a timing chart illustrating an example of a change in a vertical scanning period of a display image due to insertion of dummy data in the image output circuit.

The second vertical synchronization signal DVsync, the second horizontal synchronization signal DHsync, and the data enable signal DE for one frame illustrated in FIG. 11, for example, are obtained by executing such a process. FIG. 11(A) is a case in which the image data Dgb of all the lines in one frame of the display image can be output in synchronization with the second horizontal synchronization signal DHsync of the EVF 50, and the determination condition of step S5 described above is satisfied for all the lines in one frame. In this case, in the entire horizontal scanning period of the vertical display active period VDISP, the image output circuit 30 outputs the valid image data Dgb, and thus, a dummy DHsync period is not inserted. Meanwhile, FIG. 11(B) illustrates a case in which the determination condition of step S5 described above is not satisfied for some lines in one frame. In this case, the image output circuit 30 outputs invalid image data Dgb (dummy data) in the horizontal scanning period in a part of the vertical display active period VDISP. That is, when it is determined in step S5 that the valid image data Dgb cannot be output, the data enable signal DE becomes inactive in the line. Hereinafter, the horizontal scanning period in which the invalid image data Dgb (dummy data) is output in the vertical display active period VDISP is referred to as a dummy DHsync period.

In the example illustrated in FIG. 11(B), the data enable signal DE becomes inactive as a result of the valid image data Dgb being determined to be unable to be output in periods Tc and Td. These periods correspond to the dummy DHsync period. Accordingly, the vertical display active period VDISP of one frame is longer by a period in which the dummy DHsync period is inserted in comparison with FIG. 11(A). Thus, a length of the vertical display active period VDISP of one frame is adjusted in units of horizontal scanning periods. Also, the valid image data Dgb adjusted to a timing at which the data is able to be output can be supplied from the image output circuit 30 to the EVF controller 40. The display can be performed in synchronization with a timing of the imaging data Ds from the image sensor 12 (synchronization with precision in units of horizontal scanning periods) by driving the EVF 50 according to the image data Dgb of the display image subjected to timing adjustment. Further, as described above, it is possible to minimize the insertion of the dummy DHsync period and minimize a delay (phase difference) from the output of the imaging data Ds from the image sensor 12 to displaying on the liquid crystal panel 51.

Figure 12:
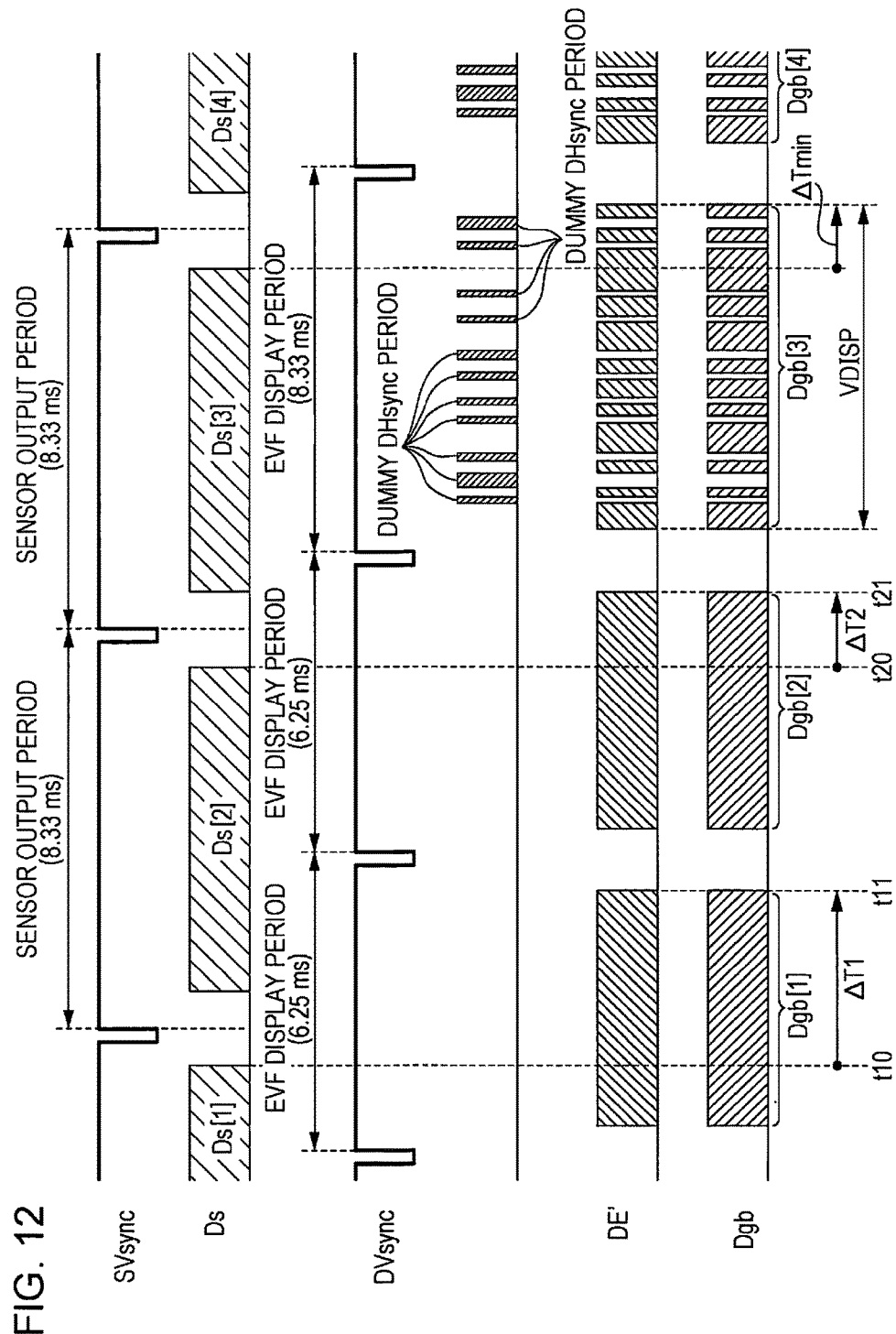
FIG. 12 is a timing chart illustrating an example of image processing of each line of image data of a display image in the vertical scanning period and an output process of the image data.

FIG. 12 is a diagram illustrating a process in which the image data Dgb of the display image output from the image output circuit 30 to the EVF controller 40 is synchronized with the imaging data Ds from the image sensor 12 through the timing adjustment as described above. FIG. 12 illustrates a case in which a frame rate of the imaging data Ds of the image sensor 12 is 120 FPS [frame/second] (a frame period of 8.33 mS), and the frame rate of the image data Dgb that can be displayed on the EVF 50 is 160 FPS (a frame period of 6.25 mS).

Further, data enable signal DE' illustrated in FIG. 12 is obtained by roughly catching the data enable signal DE in the 1 vertical scanning period. That is, strictly, a part shown by hatching the data enable signal DE' is not always at a high level, but becomes a high level during a horizontal display active period HDISP in the 1 horizontal scanning period 1H, as illustrated in FIG. 11.

As illustrated in FIG. 12, imaging data Ds [1] output from the image sensor 12 ends at time point t10, whereas image data Dgb[1] ends at a time point tn. In this case, a delay time delta T1 (phase difference) between the imaging data Ds [1] and the image data Dgb[1] is relatively long. Here, the long delay time delta T1 means that there is enough time from the end of the image processing in the image processing circuit 20 to the start of the output of the image data Dgb of the display image in the image output circuit 30. When there is enough time in this way, the dummy DHsync period is not inserted.

In this example, since the EVF display period (6.25 ms) is shorter than the sensor output period (8.33 ms), a delay time delta T2 from a time point t20 at which output of imaging data Ds [2] of a next frame ends to a time point t21 at which output of image data Dgb[2] of the display image corresponding to the frame from the image output circuit 30 ends is shorter than delta T1. Thus, when the adjustment of the output timing progresses, the delay time is shortened. However, the image data Dgb of the display image in the image processing circuit 20 is not generated in time in a step in which the delay time is shortened to some extent. Thus, in the image output circuit 30, a line of the image data Dgb of the display image that cannot be output in synchronization with the second horizontal synchronization signal DHsync is generated, and the dummy DHsync period is inserted (for example, image data Dgb[3] in FIG. 12). As a result, a minimum dummy DHsync period is inserted until the line becomes able to be output, the vertical display active period VDISP of the frame is extended, and the adjustment of the output timing progresses. Finally, the delay time converges on a constant delay time delta Tmin that is a minimum delay (minimum phase difference) and is stabilized, and the output timing of the image data from the image output circuit 30 is synchronized with the output timing of the imaging signal from the image sensor 12 (for example, after image data Dgb[3] in FIG. 12).

In such a synchronized state, the adjustment of the output timing is performed through the insertion of the dummy DHsync period, and thus, the delay time delta Tmin is likely to vary in a period of the second horizontal synchronization signal DHsync generated by the timing generator 35. However, as described above, a determination is made as to whether the output synchronized with the second horizontal synchronization signal DHsync for each line of the image data Dgb of the display image is possible (step S5 illustrated in FIG. 10), and the insertion of the dummy DHsync period is a minimum period until the output of the image data Dgb of the line is possible. Therefore, in the synchronized state, adjustment to the minimum delay time delta Tmin according to, for example, a situation of the image processing in the image processing circuit 20 is performed. That is, in this imaging display apparatus 1, the delay (phase difference) from the output of the imaging data Ds from the image sensor 12 to the displaying on the liquid crystal panel 51 is minimized. Therefore, in this imaging display apparatus 1, it is possible to perform the display of the EVF 50 synchronized with the output timing of the imaging data Ds from the image sensor 12 with a minimized delay time.

Figure 13:
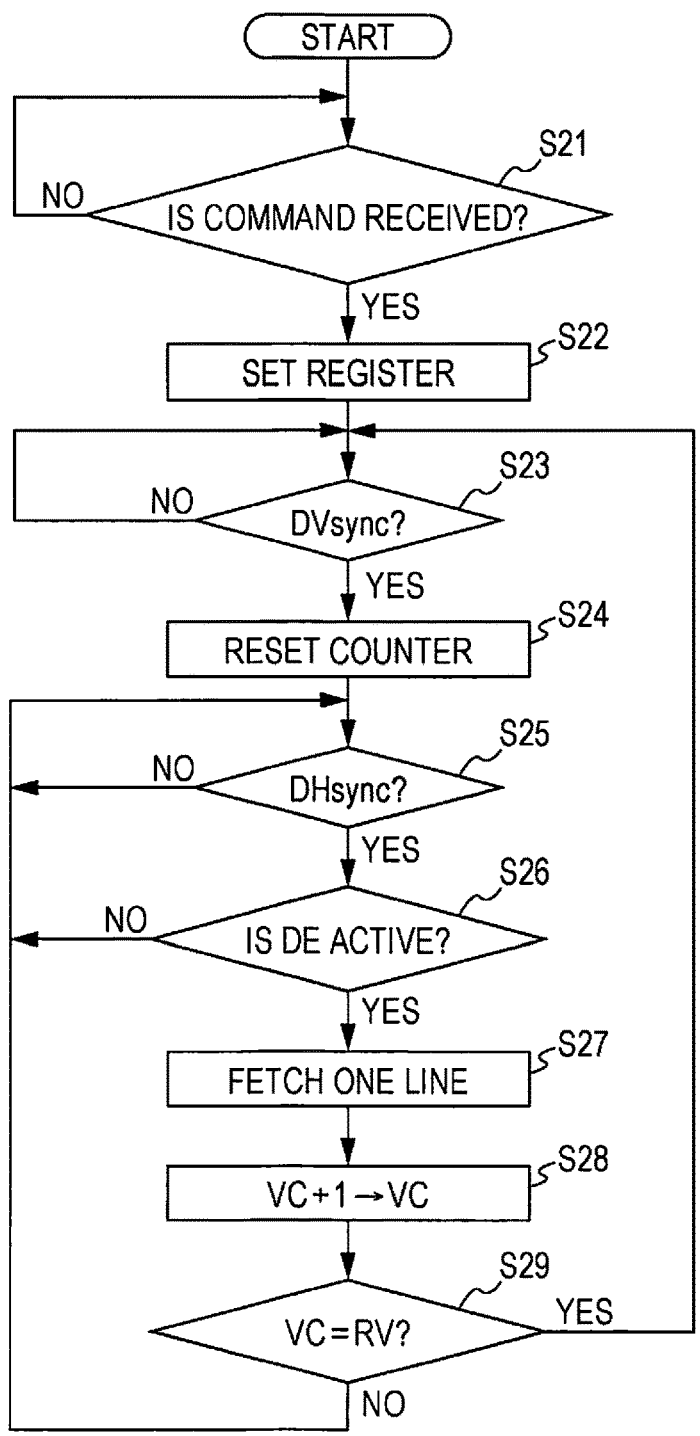
FIG. 13 is a flowchart illustrating an example of a driving operation of an EVF in the EVF controller.

Then, an operation related to the live view mode of the EVF controller 40 will be described. Processing content in the live view mode executed by the EVF controller 40 is illustrated in FIG. 13. First, prior to start of the operation in the live view mode, the EVF controller 40 determines whether a command (for example, a setting parameter including a variable name and a value of the register) from the image output circuit 30 supplied via the serial I/F 45 is received (S21), and sets the value of the register 43a according to the command from the image output circuit 30 when the command is received (S22).

Then, the timing generation unit 43 determines whether the second vertical synchronization signal DVsync supplied from the image output circuit 30 becomes active (S23). If the second vertical synchronization signal DVsync becomes active, the timing generation unit 43 resets a count value of the counter 42 (S24). Then, the data input unit 41 determines whether the second horizontal synchronization signal DHsync is active (S25). When the second horizontal synchronization signal DHsync is active, the data input unit 41 determines whether the data enable signal DE supplied from the data output control unit 31 is active (S26).

If the data enable signal DE is active, the data input unit 41 fetches the image data Dgb of the display image from the data output control unit 31 for one line (S27). In this case, the counter 42 increments the count value VC (S28). Further, the timing generation unit 43 causes the scanning line selection unit 52 to select a line (scanning line) corresponding to the count value VC, and causes the data output unit 44 to supply the image data for one line fetched by the data input unit 41 to the data line driving unit 53. The data line driving unit 53 writes the supplied image data to a pixel of the scanning line selected by the timing generation unit 43 via the data line. Accordingly, the image of the selected line is displayed on the liquid crystal panel 51.

Then, the timing generation unit 43 determines whether the count value VC of the counter 42 reaches RV ("the number of vertical pixels (the number of valid lines)" set in the register 43a) (S29). When the count value VC is equal to the valid line number RV, the reception of the image data Dgb of all lines in one frame ends, and thus, the data input unit 41 returns to step S23 to wait for the second vertical synchronization signal DVsync of the next frame. When the count value VC is not equal to the valid line number RV, the reception of the image data Dgb of all lines in one frame does not end, and thus, the data input unit 41 returns to step S25 to wait for the second horizontal synchronization signal DHsync to be active.

Further, in step S26 described above, when the data enable signal DE is inactive, the image data Dgb from the data output control unit 31 is dummy data (invalid data), and thus, the image data Dgb is not fetched and the process returns to step S25 to wait for the second horizontal synchronization signal DHsync to be active.

In the above-described operation, the EVF controller 40 can control displaying on the liquid crystal panel 51 based on the image data Dgb of the display image during a period in which the data enable signal DE is active, among the image data Dgb supplied from the image output circuit 30.

Figure 14:
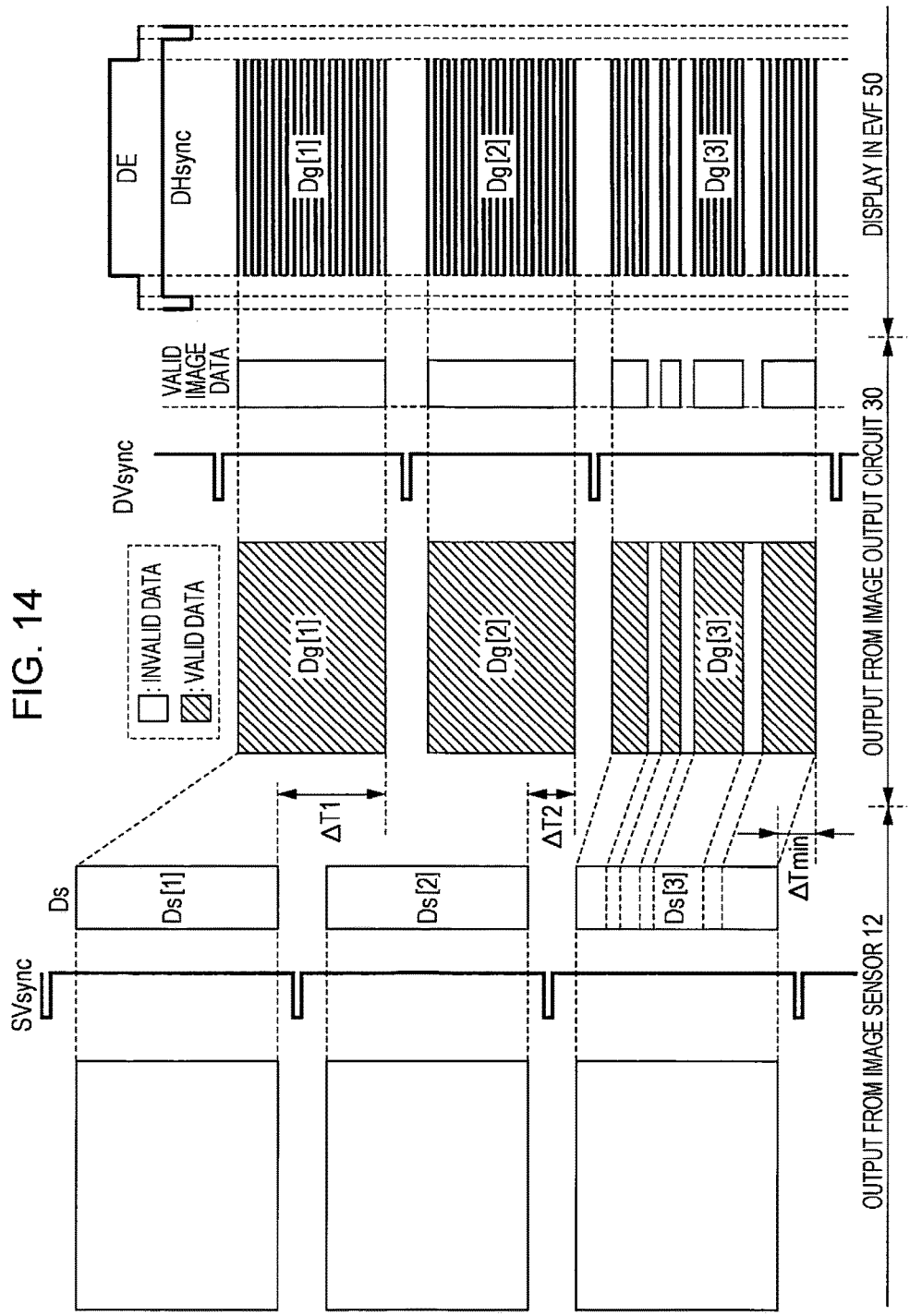
FIG. 14 is a conceptual diagram conceptually illustrating an example of an operation from output of an imaging signal of an imaging unit to driving of the EVF.

FIG. 14 is a conceptual diagram schematically illustrating a timing up to the output of the imaging data Ds from the above-described image sensor 12, the output of the image data Dgb of the display image from the image output circuit 30, and the displaying on the EVF 50 for frames for which operation states are different, and corresponds to FIG. 12 described above. Since a delay time delta T1 is relatively long for the imaging data Ds [1] output from the image sensor 12, there is enough time for processing in the image output circuit 30. Therefore, the image data Dgb [1] is generated without the dummy DHsync period being inserted. A delay time delta T2 of a next frame being shorter than the delay time delta T1 is because the frame rate of the EVF 50 is shorter than the frame rate of the image sensor 12. In the next frame, the delay time is further shortened and becomes a minimum delay time delta Tmin, but processing in the image processing circuit 20 is not performed in time, and a dummy DHsync period is inserted. As a result, image data Dg [3] includes invalid data, and valid data becomes intermittent. The output of the image data Dgb of the display image from the image output circuit 30 may become intermittent in units of horizontal scanning periods (an interval of the second horizontal synchronization signal DHsync) according to the progress information P from the above-described image processing circuit 20. In this case, the displaying on the EVF' 50 is intermittent in units of horizontal scanning periods, as well. That is, the driving timing of each line in one frame in the EVF 50 slightly varies in units of horizontal scanning periods (the interval of the horizontal synchronization signal), but this variation is not recognized by a person since the variation is sufficiently smaller than the display period (vertical scanning period) of one frame.

<Effects>

As described above, in this imaging display apparatus 1, the image output circuit 30 determines whether one line of the image data Dgb of the display image is able to be output in synchronization with the second horizontal synchronization signal DHsync according to the progress information P from the image processing circuit 20, outputs the image data Dgb of the display image for one line to the EVF controller 40 in synchronization with the second horizontal synchronization signal DHsync when the line is able to be output, and outputs the dummy data when the line is unable to be output, such that the timing at which the image data Dgb of the display image is output can be adjusted in units of horizontal scanning periods. The output timing of the image data Dgb of the display image output from the image output circuit 30 can be synchronized with the output timing of the imaging data Ds from the image sensor 12 by performing such timing adjustment. In this case, the synchronization is performed with precision in units of horizontal scanning periods.

Further, for the above-described progress information P, the pulse at a high level is output at a timing at which image processing for the imaging data Ds from the image sensor 12 is performed, the generation for one line of the image data Dga of the display image ends, and the writing to the VRAM/line buffer 28 ends. The image data Dgb of the display image can be output with a minimum delay time by adjusting the output timing of the image data Dgb of the display image from the image output circuit 30 according to such progress information P. Therefore, in this imaging display apparatus 1, the image data Dgb for the display image for which an increase in the delay time is suppressed can be output in synchronization with the output timing of the imaging data Ds from the image sensor 12. As a result, in this imaging display apparatus 1, the displaying of the image on the liquid crystal panel 51 is synchronized with the output timing of the imaging data Ds from the image sensor 12, and the delay time up to displaying on the liquid crystal panel 51 is minimized (in units of horizontal scanning periods).

Here, in order to cause the display of the display image on the liquid crystal panel 51 to be synchronized with the output timing of the imaging data Ds of the image sensor 12, adjustment of the length of the horizontal scanning period in units of dot clock periods on the liquid crystal panel 51 side is performed according to the timing at which the image data Dgb of the display image becomes able to be output and, as a result, timing adjustment of the vertical scanning period is considered. When such timing adjustment is performed, a circuit capable of following variation in the horizontal scanning period (variation in the timing of the horizontal synchronization signal) is necessary on the EVF 50 side, and thus, a configuration of the circuit is complicated.

On the other hand, in this imaging display apparatus 1, since the timing adjustment is performed in units of horizontal scanning periods on the liquid crystal panel 51 side, and, as a result, the timing adjustment of the vertical scanning period is performed, the horizontal synchronization signal on the liquid crystal panel 51 side is output at a constant timing. The circuit following such a horizontal synchronization signal may be able to follow the horizontal synchronization signal at the same degree as when the image data of the display image is supplied at a constant interval of the horizontal synchronization signal at a constant frame rate. Therefore, in this imaging display apparatus 1, it is necessary to add a counter that counts the number of lines of the valid image data Dgb in the vertical scanning period based on the above-described data enable signal DE, but this configuration is not complicated in comparison with the case in which the timing is changed in units of dot clock units on the liquid crystal panel 51 side. Therefore, in this imaging display apparatus 1, shortening of the delay time from imaging in the image sensor 12 to displaying on liquid crystal panel 51 can be realized by a simple circuit configuration.

<Variant Example>

The present invention is not limited to the respective embodiments described above and various variant examples to be described below are possible. Further, each variant example may be an appropriate combination of variant examples or may be an appropriate combination of the above-described embodiments.

(1) While the example of the liquid crystal panel has been described as an example of the liquid crystal panel 51 in the above-described description, the present invention can also be applied to a case in which a display element such as an organic light emitting diode (OLED) panel or a plasma display panel is used, similar to the above-described embodiment.

(2) While the image processing circuit 20 operates to output the pulse at a high level as the progress information P when one line of the image data of the display image is able to be output in the above-described description, the pulse at a high level may be output as the progress information P when a predetermined number of lines (block unit) of the display image is able to be output. In this case, the image output circuit 30 outputs the image data of the display image for a predetermined number of subsequent lines (block unit) to the EVF controller 40 in synchronization with the horizontal synchronization signal according to the progress information P and then, waits for the pulse at a high level to be supplied as the progress information P. Further, the pulse at a high level may be output as the progress information P when the display image for units of blocks is able to be output as units of blocks using a half of one line or a predetermined area as units of blocks.

(3) While the enable signal DE that becomes active when the image signal Dgb is a valid image signal and becomes inactive when the image signal Dgb is an invalid image signal has been described as an example of the control signal in the above-described embodiment, the present invention is not limited thereto. For example, a disable signal that becomes active when the image signal Dgb is an invalid image signal and becomes inactive when the image signal is a valid image signal may be used. That is, a control signal indicating that the image signal Dgb is valid or invalid may be used.

Further, while the processing time of the image processing in the image processing circuit 20 is variable in the above-described embodiment, the present invention is not limited thereto and the processing time may be fixed. Even in this case, the delay time can be gradually shortened and the synchronization can be performed with precision in units of horizontal synchronization periods even when the delay time of the output of the image sensor 12 and the displaying of the EVF 50 is long by outputting the enable signal DE indicating that the image signal is valid or invalid from the image output circuit 30 together with the image signal Dgb using the progress information P.

Figure 15:
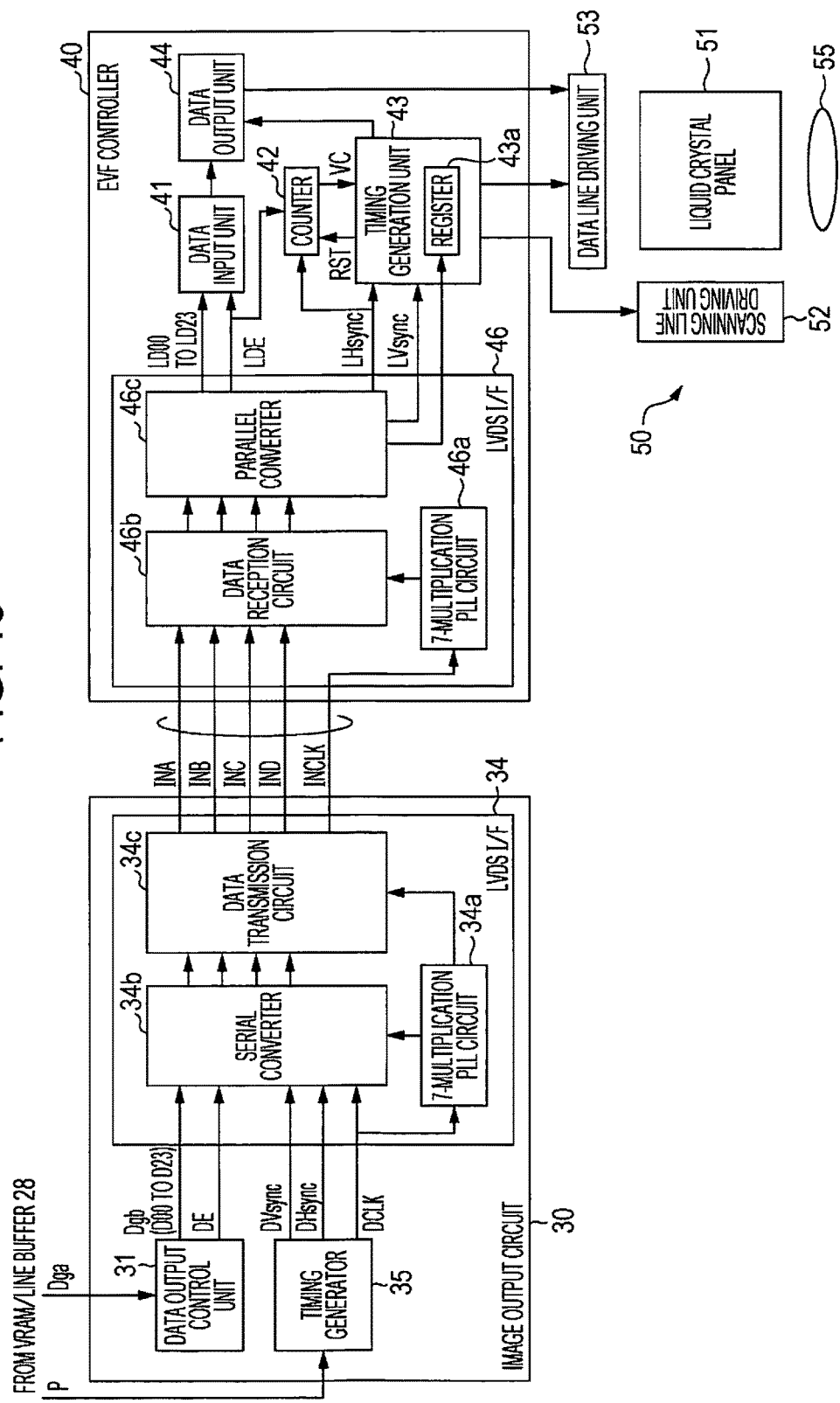
FIG. 15 is a block diagram illustrating a configuration example of an EVF controller constituting an imaging display apparatus according to a variant example.

(4) While the data transmission between the image output circuit 30 and the EVF controller 40 is performed using the parallel I/F (D00 to D23) in the above-described description, the data transmission may be performed using a serial I/F of low voltage differential (LVDS). In this case, for example, an LDVS I/F 34 and an LDVS I/F 46 are provided in the image output circuit 30 and the EVF controller 40, respectively, as illustrated in FIG. 15.

The LDVS I/F 34 includes a 7-multiplication PLL circuit 34*a* that 7-multiplies the second dot clock DCLK, a serial converter 34*b* that converts image data (parallel) of the display image from the data output control unit 31 into a serial signal, and a data transmission circuit 34*c* that transmits the image data subjected to serial conversion. Further, the LDVS I/F 46 includes a 7-multiplication PLL circuit 46*a* that 7-multiplies a received clock, a data reception circuit 46*b* that receives image data (serial) from the data transmission circuit 34*c*, and a parallel converter 46*c* that converts the received image data (serial) of the display image into a parallel signal and supplies the parallel signal to the data input unit 41.

Figure 16:
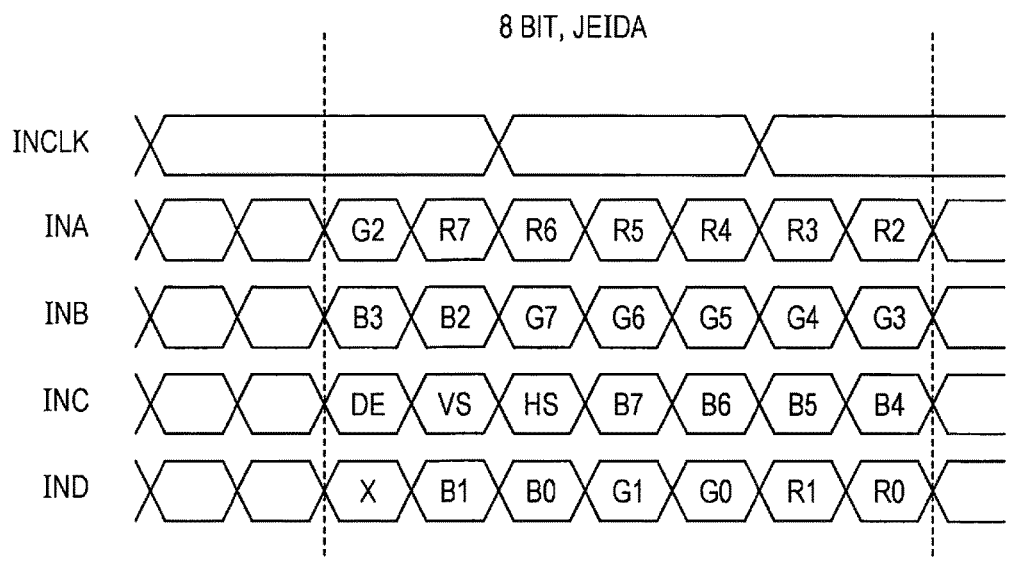
FIG. 16 is a diagram illustrating an example of an image signal (image data) for one pixel of a display image in an LVDS signal.
Figure 17:
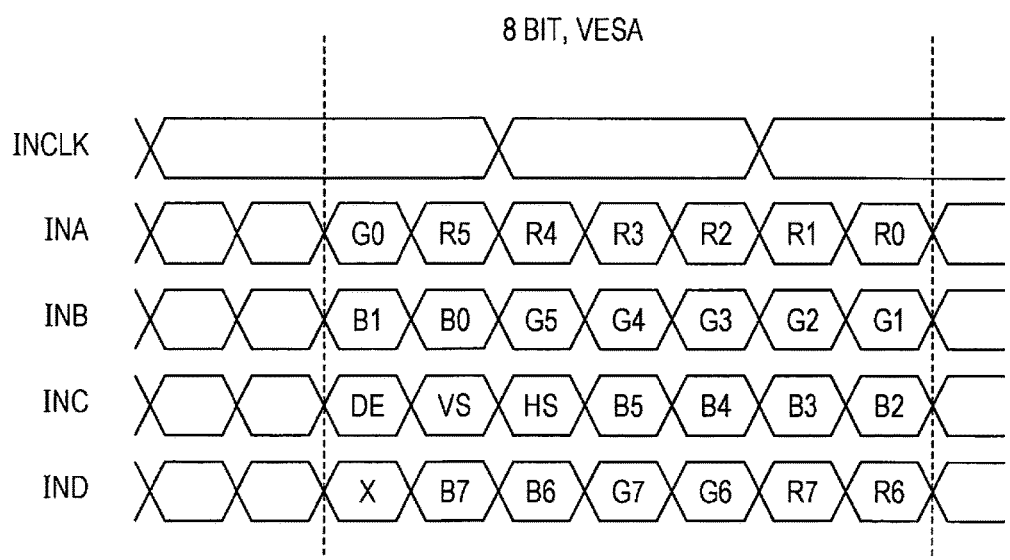
FIG. 17 is a diagram illustrating another example of an image signal (image data) for one pixel of a display image in an LVDS signal.

Between the LDVS I/F 34 and the LDVS I/F 46, the vertical synchronization signal DVsync (VS), the horizontal synchronization signal DHsync (HS), the data enable signal DE, and the image data Dgb (D00 to D23: 8 bits of RGB colors; R0 to R7, G0 to G7, and B0 to B7) are transmitted, for example, as a serial signal for 4-differential input and output in synchronization with a clock INCLK, as in FIG. 16 (JEIDA scheme) or FIG. 17 (VESA scheme). Further, in FIG. 15, the image data LD00 to LD23, the data enable signal LDE, the second horizontal synchronization signal LHsync, and the second vertical synchronization signal LVsync are described so as to distinguish signals and data between after LDVS transmission and before the transmission, but these correspond to the image data D00 to LD23, the data enable signal DE, the second horizontal synchronization signal DHsync, and the second vertical synchronization signal DVsync, respectively.

The same operation and effects as those in the above-described embodiment can be achieved even when transmission of image data of the display image or the like is performed between the image output circuit 30 and the EVF controller 40 using such an LDVS I/F.

(5) While the value of the register 43*a* is transmitted between the serial I/F 33 and the serial I/F 45 in the above-described description, the value may be transmitted as data (D00 to D23) in the period in which the data enable signal DE is inactive when the LDVS I/F is used as described above.

(6) While the case in which the EVF is built in the imaging display apparatus 1 has been described in the above-described description, the EVF controller 40 and the EVF 50 may be configured as, for example, a finder (display device) connected to the outside of a digital camera. In this case, the device may be an imaging device further including the image output circuit 30.

(7) While the case in which the invention is configured as the imaging display apparatus 1 has been described in the above-described description, the present invention is not limited thereto and may be configured as, for example, electronic equipment (display device) such as a projector device, a head up display (HUD), or a head mount display (HMD). Further, the present invention can be applied to, for example, electronic binoculars, electronic glasses, an electron microscope, a finder of medical electron glasses, an in-vehicle back monitor, or a monitor of an in-vehicle side-view mirror as long as they are display devices performing live view, and a delay from imaging to displaying can be reduced. Further, in an aspect of the display device, the imaging unit 10 may not necessarily be included. That is, the image processing circuit 20 to which the imaging data Ds is supplied, the image output circuit 30, the EVF controller 40, and the EVF 50 may be regarded as the display device.

Reference Signs List

1 Imaging display apparatus
12 Image sensor
20 Image processing circuit
30 Image output circuit
31 Data output control unit
40 EVF controller
41 Data input unit
42 Counter
43 Timing generation unit
44 Data output unit
50 EVF
51 Liquid crystal panel
52 Scanning line selection unit
53 Data line driving unit.

The invention claimed is:

1. An imaging device comprising:
an imaging sensor that captures an image and outputs an imaging signal; and
an image processor that outputs an image signal that is generated by image processing performed on the imaging signal, and outputs a control signal indicating whether the output image signal is valid or invalid in synchronization with a horizontal synchronization signal, the image signal including an invalid image signal and a valid image signal,
the image processor outputting both of the invalid image signal and the valid image signal during at least one time period between one horizontal synchronization signal and a subsequent horizontal synchronization signal which is subsequent to the one horizontal synchronization signal,
the image processor further determining whether or not the image signal is ready to be output or not in response to the horizontal synchronization signal becoming active,
when determining the image signal is ready to be output, the image processor changing the control signal from an invalid control signal indicating that the output image signal is invalid to a valid control signal indicating that the output image signal is valid at a start timing of a horizontal display active period, and outputting the valid control signal during the horizontal display active period,
when determining the image signal is not ready to be output, without changing the control signal from the invalid control signal to the valid control signal at the start timing of the horizontal display active period, the image processor outputting the invalid control signal during the horizontal display active period.

2. The imaging device according to claim 1, wherein a period of the horizontal synchronization signal is constant, and
either the invalid image signal or the valid image signal is output in synchronization with the horizontal synchronization signal.

3. The imaging device according to claim 2, wherein the image processor outputs a control signal indicating that the image signal is the valid image signal when the image signal is able to be output in synchronization with the horizontal synchronization signal, and outputs a control signal indicating that the image signal is the invalid image signal when the image signal is unable to be output in synchronization with the horizontal synchronization signal.

4. The imaging device according to claim 2, wherein the image processor includes
an image processing circuit which performs image processing of which processing time is variable on the imaging signal, and outputs progress information indicating progress of the image processing; and
an image output circuit that determines whether a signal obtained through the image processing of the image processing circuit is able to be output as the valid image signal in synchronization with the horizontal synchronization signal based on at least the progress information, and outputs the valid image signal when a determination condition is positive and the invalid image signal when the determination condition is negative.

5. The imaging device according to claim 4, wherein
when the determination condition for a first signal obtained through the image processing of the image processing circuit is negative, the image output circuit outputs the invalid image signal, and after outputting the invalid image signal, the image output circuit outputs the first signal as the valid image signal in response to the determination condition for the first signal becoming positive.

6. The imaging device according to claim 1, wherein
a rising timing and a falling timing of a data enable signal that corresponds to the control signal are synchronized with a falling edge of a dot clock that is generated at the image processor.

7. An imaging display apparatus comprising:
the imaging device according to claim 2;
a display control device including a display processor that inputs the image signal and the control signal that are output from the image processor, and performs control to cause the valid image signal to be displayed on a display based on the control signal, the display processor inputting both of the invalid image signal and the valid image signal of the image signal during the at least one time period, the display processor inputting the valid control signal that is output from the image processor when the image processor determines the image signal is ready to be output, the display processor inputting the invalid control signal that is output from the image processor when the image processor determines the image signal is not ready to be output; and
the display that displays the valid image signal.

8. An image processing device comprising:
an image processor that outputs an image signal that is generated by image processing performed on an imaging signal obtained by capturing an image, and outputs a control signal indicating whether the output image signal is valid or invalid in synchronization with a horizontal synchronization signal, the image signal including an invalid image signal and a valid image signal,
the image processor outputting both of the invalid image signal and the valid image signal during at least one time period between one horizontal synchronization signal and a subsequent horizontal synchronization signal which is subsequent to the one horizontal synchronization signal,
the image processor further determining whether or not the image signal is ready to be output or not in response to the horizontal synchronization signal becoming active,
when determining the image signal is ready to be output, the image processor changing the control signal from an invalid control signal indicating that the output image signal is invalid to a valid control signal indicating that the output image signal is valid at a start timing of a horizontal display active period, and outputting the valid control signal during the horizontal display active period,
when determining the image signal is not ready to be output, without changing the control signal from the invalid control signal to the valid control signal at the start timing of the horizontal display active period, the image processor outputting the invalid control signal during the horizontal display active period.

9. A display control device comprising:
a display processor that
inputs an image signal and a control signal indicating whether the image signal is valid or invalid in synchronization with a horizontal synchronization signal, the image signal including an invalid image signal and a valid image signal, the display processor inputting both of the invalid image signal and the valid image signal during at least one time period between one horizontal synchronization signal and a subsequent horizontal synchronization signal which is subsequent to the one horizontal synchronization signal, and
performs control to cause the valid image signal to be displayed on a display based on the control signal,
the display processor inputting a valid control signal that indicates that the image signal is valid, that is changed from an invalid control signal indicating that the image signal is invalid at a start timing of a horizontal display active period, and that is output from an image processor during the horizontal display active period, when the image signal is determined to be ready to be output at the image processor, and,
the display processor inputting the invalid control signal that is output from the image processor during the horizontal display active period and that is unchanged at the start timing of the horizontal display active period, when the image signal is determined not to be ready to be output at the image processor.

10. The display control device according to claim 9, wherein a frame rate of the display is higher than a frame rate of an imaging signal.

* * * * *